US012650621B2

(12) United States Patent
Anazawa et al.

(10) Patent No.: US 12,650,621 B2
(45) Date of Patent: Jun. 9, 2026

(54) CAPILLARY-ARRAY-ELECTROPHORESIS DEVICE

(71) Applicant: HITACHI HIGH-TECH CORPORATION, Tokyo (JP)

(72) Inventors: Takashi Anazawa, Tokyo (JP); Ryoji Inaba, Tokyo (JP); Shuhei Yamamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 407 days.

(21) Appl. No.: 18/267,242

(22) PCT Filed: Dec. 18, 2020

(86) PCT No.: PCT/JP2020/047358

§ 371 (c)(1),
(2) Date: Jun. 14, 2023

(87) PCT Pub. No.: WO2022/130606

PCT Pub. Date: Jun. 23, 2022

(65) Prior Publication Data

US 2024/0053651 A1      Feb. 15, 2024

(51) Int. Cl.
  *G02F 1/13* (2006.01)
  *G02F 1/1677* (2019.01)
  *G02F 1/167* (2019.01)
(52) U.S. Cl.
  CPC ............. *G02F 1/13* (2013.01); *G02F 1/1677* (2019.01); *G02F 1/167* (2013.01)
(58) Field of Classification Search
  CPC ........... G02F 1/167; G02F 1/1677; G02F 1/13
  See application file for complete search history.

(56) References Cited

U.S. PATENT DOCUMENTS 8,304,712 B2      11/2012  Gorfinkel et al.
2003/0226756 A1      12/2003  Inaba et al.

FOREIGN PATENT DOCUMENTS

JP      9-96623 A      4/1997
JP      9-152418 A      6/1997
      (Continued)

OTHER PUBLICATIONS

Chinese Office Action received in corresponding Chinese Application No. 202080107732.4 dated Feb. 25, 2025.

(Continued)

*Primary Examiner* — Stephone B Allen
*Assistant Examiner* — Tamara Y. Washington
(74) *Attorney, Agent, or Firm* — MATTINGLY & MALUR, PC

(57) ABSTRACT

When arraying laser-irradiation portions of a plurality of capillaries on the same array plane, simultaneous irradiation of the capillaries with a laser beam incident from the side is enabled by filling the capillaries with a separation medium having a low refractive index of $n_3 < 1.36$ and by setting $n_1 = 1.00$, $n_2 = 1.46$, $R/r < 5.9$, and $\Delta Z \le 9$ $\mu$m, wherein a distance in a direction perpendicular to the array plane between two capillaries, which are farthest from each other in the perpendicular direction among the capillaries in the laser-irradiation portions, is denoted by $2 \times \Delta Z$, wherein an outer radius, an inner radius, a refractive index of an external medium, a refractive index of a material, and a refractive index of an internal medium of each of the capillaries in the laser-irradiation portions are denoted by R, r, $n_1$, $n_2$, and $n_3$, respectively.

14 Claims, 17 Drawing Sheets

Z (a)

X

Z $\pm \Delta Z$ (b)

X

(56) References Cited

FOREIGN PATENT DOCUMENTS

| JP | H09152418 | A | * | 6/1997 |
| JP | 2003-262616 | A | | 9/2003 |
| JP | 2004144479 | A | * | 5/2004 |
| JP | 3654290 | B2 | | 6/2005 |
| JP | 5039156 | B2 | | 10/2012 |

OTHER PUBLICATIONS

Great Britain Office Action received in corresponding Great Britain Application No. GB2308802.4 dated Mar. 14, 2025.

Andriy Tsupryk, et al., "Novel design of multicapillary arrays for high-throughput DNA sequencing", Electrophoresis 2006, 27, 2869-2879.

International Search Report of PCT/JP2020/047358 dated Mar. 16, 2021.

* cited by examiner (a)

(b)

(a)

(b)

(a)

(b)

(a)

(b)

(c)

(a)

(b)

(c)

(a)

(b)

(c)

(a)

(b)

(c)

(a)

(b)

(c)

CAPILLARY-ARRAY-ELECTROPHORESIS DEVICE

TECHNICAL FIELD

The present disclosure relates to a capillary-array-electrophoresis device.

BACKGROUND ART

Capillary-array-electrophoresis devices have been widely used in which a plurality of capillaries made of quartz glass is filled with an electrophoretic separation medium such as an electrolyte solution or an electrolyte solution containing a polymer gel or a polymer, to perform electrophoresis analysis in parallel. As compared with the conventional capillary-electrophoresis devices using one capillary, the capillary-array-electrophoresis devices can reduce an analysis cost per sample as well as can improve an analysis throughput. The most widely used capillary-array-electrophoresis devices are the 3500 Series Genetic Analyzer and the 3730 Series Genetic Analyzer being sold by Thermo Fisher Scientific Inc. The 3500 Series Genetic Analyzer can perform parallel electrophoresis analysis using 8 or 24 capillaries. The 3730 Series Genetic Analyzer can perform parallel electrophoresis analysis using 48 or 96 capillaries. In any case, laser-irradiation portions of a plurality of capillaries (parts of a capillary array irradiated by a laser) are arrayed on the same plane. A polyimide coating of each capillary around the laser-irradiation portion is removed. The same plane is referred to as an array plane. An array of the plurality of capillaries is referred to as the capillary array. By introducing the laser beam from the side of the array plane during electrophoresis, the plurality of capillaries are simultaneously irradiated. Laser-induced fluorescence from each of the capillaries is spectrally dispersed and simultaneously detected. A method in which the laser beam is incident from the side of the array plane to simultaneously irradiate the plurality of capillaries is called a multiple laser-beam-focusing technique. Such a multiple laser-beam-focusing technique is described in detail in PTL 1. In the multiple laser-beam-focusing technique, each of the capillaries functions as a convex lens. The laser beam is repeatedly focused by the convex lenses along the array plane, thereby enabling simultaneous irradiation of the plurality of capillaries. As a result, it is possible to perform in parallel DNA sequencing or DNA fragment analysis of samples as many as the number of the capillaries. As described in PTL 1, when an outer radius of a capillary is R (an outer diameter is 2R), an inner radius of the capillary is r (an inner diameter is 2r), a refractive index of a material of the capillary is $n_2$, a refractive index of a medium outside the capillary is $n_1$, a refractive index of a medium (separation medium) inside the capillary is $n_3$, a distance between an incident position of a laser beam and an array plane is x ($\leq$r), and x=r/2 is defined, in laser-irradiation portions of the plurality of capillaries, a refraction angle when the laser beam transmits through one capillary is expressed by the following Formula (1).

$$\Delta\theta = \tag{1}$$
$$\left| 2 \cdot \left\{ -\sin^{-1}\left(\frac{r}{2 \cdot R}\right) + \sin^{-1}\left(\frac{r \cdot n_1}{2 \cdot R \cdot n_2}\right) - \sin^{-1}\left(\frac{n_1}{2 \cdot n_2}\right) + \sin^{-1}\left(\frac{n_1}{2 \cdot n_3}\right) \right\} \right|$$

Each of the capillaries functions as a concave lens when $\Delta\theta > 0$ is satisfied and as a convex lens when $\Delta\theta < 0$ is satisfied. Under a condition satisfying $\Delta\theta < 0$, the multiple laser-beam focusing functions, and thus it becomes possible to perform the simultaneous irradiation of the plurality of capillaries with the laser beam. On the other hand, under a condition satisfying $\Delta\theta > 0$, because the multiple laser-beam focusing does not function and the laser beam diverges from the array plane, it becomes impossible to perform the simultaneous irradiation of the plurality of capillaries with the laser beam. In general, the material of the capillary is quartz glass and is fixed at $n_2$=1.46. It is understood from Formula (1) that in order to enhance a convex lens function (or, weaken a concave lens function) of each of the capillaries. By contrast, the concave lens function of each of the capillaries is intensified as $n_1$ is larger and $n_3$ is smaller.

Even when the multiple laser-beam focusing functions, intensity of the laser beam attenuates as the laser beam travels in the capillary array due to reflection losses of the laser beam at interfaces between the medium outside the capillaries and the capillaries, and at interfaces between the medium inside the capillaries and the capillaries. Thus, the obtained fluorescence intensity also attenuates accordingly. If the fluorescence intensity is greatly different between the capillaries, it becomes unable to analyze a plurality of samples under equivalent conditions, which is disadvantageous. (Note that the fluorescence intensity is used as a representative of a signal intensity in embodiments to be described later, but a signal intensity other than the fluorescence intensity, for example, a scattering intensity or an absorbance may be used.) In this regard, in the 3500 Series genetic analyzer and the 3730 Series Genetic Analyzer, the laser beam emitted from one laser-light source is divided into two beams. The two laser beams are made incident from both sides of the array plane, so that the multiple laser-beam focusing functions for each of the laser beams. In this way, the sum of an intensity of the laser beam incident from one side of the array plane and an intensity of the laser beam incident from the other side of the array plane is made uniform. A configuration in which the laser beam is made incident only from one side of the array plane is referred to as one-side irradiation. A configuration in which the laser beams are made incident from both the sides of the array plane is referred to as both-side irradiation. Whether the multiple laser-beam focusing functions or does not function is common in both the one-side irradiation and the both-side irradiation.

In DNA sequencing or DNA fragment analysis performed by the 3500 Series Genetic Analyzer and the 3730 Series Genetic Analyzer, a polymer solution containing a high concentration of urea as a denaturant is used as a separation medium in order to electrophoretically separate DNA fragments contained in a sample in a single-stranded state. In practice, each of POP-4, POP-6, and POP-7, which are separation media being sold for the 3500 Series Genetic Analyzer and the 3730 Series Genetic Analyzer, contains 8 M urea. A refractive index of water is 1.33, whereas a refractive index of the above-described polymer solution containing 8 M urea increases to $n_3$=1.41. This enhances a convex lens function of each capillary, which is an advantageous condition for the multiple laser-beam focusing.

With the configuration based on PTL 1, laser-irradiation portions of a plurality of capillaries each having an outer diameter 2R=323 μm and an inner diameter 2r=50 μm are disposed in the air in the 3500 Series Genetic Analyzer. That is, $n_1$=1.00 is satisfied. Since $\Delta\theta$=-1.3° is obtained from the above Formula (1), it is found that each of the capillaries has the convex lens function. Therefore, the multiple laser-beam focusing functions to enable simultaneous irradiation of 8 or 24 capillaries with a laser beam. In this configuration, however, since reflection losses of the laser beam at interfaces between the air outside the capillaries and the capillaries (made of quartz glass) are great, the number of capillaries that can be simultaneously irradiated is about 24.

On the other hand, the number of capillaries that can be simultaneously irradiated is increased in the 3730 Series Genetic Analyzer with a configuration disclosed in PTL 2. In the 3730 Series Genetic Analyzer, laser-irradiation portions of a plurality of capillaries each having an outer diameter $2R=126$ μm and an inner diameter $2r=50$ μm are disposed in a fluorine solution having a refractive index $n_1=1.29$. Since $\Delta\theta=-0.69°$ is obtained from the above Formula (1), it is found that each of the capillaries has a convex lens function and the multiple laser-beam focusing functions. Furthermore, since reflection losses of a laser beam at interfaces between the fluorine solution outside the capillaries and the capillaries (made of quartz glass) are reduced, the number of capillaries that can be simultaneously irradiated is increased. Therefore, simultaneous irradiation of 48 or 96 capillaries with a laser beam is possible.

A configuration described in NPL 1 further increases the number of capillaries that can be simultaneously irradiated. In this configuration, laser-irradiation portions of a plurality of capillaries each having an outer diameter $2R=126$ μm and an inner diameter $2r=50$ μm are disposed in a matching solution having a refractive index $n_1=1.46$. Further, among the plurality of capillaries, odd-numbered capillaries from one end are used for analysis (hereinafter, analysis capillaries), and even-numbered capillaries are used as rod lenses (hereinafter, lens capillaries). That is, the analysis capillaries and the lens capillaries are alternately arrayed. A refractive index of a medium (separation medium) inside the analysis capillaries is set to $n_3=1.41$. A refractive index of a medium inside the lens capillaries is set to $n_4=1.53$. All the capillaries are made of quartz glass and have a refractive index $n_2=1.46$. Further, since reflection losses of a laser beam at interfaces between the matching solution outside the capillaries and the capillaries (made of quartz glass) becomes zero, the number of capillaries that can be simultaneously irradiated is further increased. Furthermore, NPL 1 describes a definition of a maximum number of capillaries that can be simultaneously irradiated with a laser beam from P. 2874 to P. 2875. When an incident intensity of the laser beam is 100% with one-side irradiation, the maximum number of capillaries that can be simultaneously irradiated is a number obtained by doubling the number of capillaries where the intensity of the laser beam irradiating the capillaries is 50% or more. This is because irradiation intensities of the respective capillaries are expected to be uniform when a capillary array having such a number of capillaries is irradiated on both sides. According to this definition, the maximum number of capillaries in the configuration of PTL 2 is 150, and a maximum number of capillaries in the configuration of NPL 1 is 550.

CITATION LIST

Patent Literature

PTL 1: Japanese Patent No. 3654290
PTL 2: Japanese Patent No. 5039156

Non-Patent Literature

NPL 1: Electrophoresis 2006, 27, 2869-2879

SUMMARY OF INVENTION

Technical Problem

In all of the above known techniques, the separation medium contains a high concentration of urea, and $n_3=1.41$. On the other hand, in the capillary-electrophoresis device using one capillary, a separation medium does not necessarily contain a high concentration of urea, and various types of separation media are used. For example, a separation medium for electrophoretically separating DNA fragments in a double-stranded state does not contain urea. The separation medium has a refractive index of $n_3=1.33$, which is the same as that of water. That is, in general, a refractive index of a separation medium used in capillary electrophoresis can have various values of $1.33 \leq n_3 \leq 1.41$. In recent years, it has been required to use such various types of separation media in capillary-array-electrophoresis devices in order to achieve a high throughput or a low cost of the electrophoresis analysis using such various types of separation media.

In all of the configurations of the above-described known techniques, however, when $n_3=1.33$, the convex lens function of each of the capillaries is lost, the concave lens function becomes stronger, and the multiple laser-beam focusing does not function. That is, it does not become possible to perform parallel electrophoresis analysis using a plurality of capillaries. Details thereof are as follows.

When $n_3=1.33$ is satisfied in the 3500 Series Genetic Analyzer based on PTL 1, since $\Delta\theta=+1.3°$ is obtained from Formula (1), it is found that each of the capillaries has the concave lens function. Therefore, since the multiple laser-beam focusing does not function, it is not possible to perform the simultaneous irradiation of 8 or 24 capillaries with a laser beam.

When setting to $n_3=1.33$ in the 3730 Series Genetic Analyzer based on PTL 2, since $\Delta\theta=+2.9°$ is obtained from Formula (1), it is found that each of the capillaries has the concave lens function. Therefore, since the multiple laser-beam focusing does not function, it is not possible to perform the simultaneous irradiation of 48 or 96 capillaries with a laser beam.

When setting to $n_3=1.33$ in the configuration based on NPL 1, a refraction angle of one analysis capillary is $\Delta\theta_A=+6.6°$, whereas a refraction angle of one lens capillary is $\Delta\theta_B=-3.0°$ according to Formula (1). Under these conditions, since $\Delta\theta_A+\Delta\theta_B=+3.6°$ is obtained, one set of one analysis capillary and one lens capillary exhibits the concave lens function and the multiple laser-beam focusing does not function. When setting to $n_3=1.41$ in the configuration of NPL 1, a refraction angle of one analysis capillary is $\Delta\theta_A=+2.4°$, whereas a refraction angle of one lens capillary is $\Delta\theta_B=-3.0°$ according to Formula (1). Under this condition, since $\Delta\theta_A+\Delta\theta_B=-0.6°$ is obtained, one set of one analysis capillary and one lens capillary exhibits the convex lens function and the multiple laser-beam focusing functions. In this manner, a method of evaluating the presence or absence of the multiple laser-beam focusing function by $\Delta\theta_A+\Delta\theta_B$ has been found in the present disclosure. On page 2875 of NPL 1, there is a description that the configuration of NPL 1 is advantageous even in the case of $n_3=1.33$. However, the maximum number of capillaries in the case of $n_3=1.33$ is only about 8 with reference to FIG. 11 of NPL 1 according to the above-described definition of the maximum number of capillaries in NPL 1. Therefore, the configuration of NPL 1 does not function in the case of $n_3=1.33$.

In view of such a situation, the present disclosure proposes a technique that enables electrophoresis analysis even using various separation media having any refractive index in a range of $1.33 \leq n_3 \leq 1.41$ (of course, also compatible with to a separation medium having a refractive index outside the range of $1.33 \leq n_3 \leq 1.41$) in a capillary-array-electrophoresis device.

Solution to Problem

In order to solve the above-described problem, the present disclosure proposes, for example, a capillary-array-electrophoresis device including: a laser-light source configured to emit a laser beam; a capillary array configuring laser-irradiation portions of a plurality of capillaries collectively irradiated with the laser beam are substantially arrayed on the same array plane; and an optical system configured to collectively measure light emission from the plurality of capillaries, wherein $n_1=1.00$, $n_2=1.46\pm0.01$, $n_3<1.36$, and $R/r<5.9$ are satisfied, wherein R denote an outer radius, and r denotes an inner radius of the plurality of capillaries, while $n_1$ denotes a refractive index of an external medium, $n_2$ denotes a refractive index of a material, and $n_3$ denotes a refractive index of an internal medium of the plurality of capillaries, around the laser-irradiation portions.

Another characteristic relating to the present disclosure will become apparent from the description of the present specification and the accompanying drawings. Further, aspects of the present disclosure are achieved and realized by elements and combinations of various elements, and the following detailed description and aspects of the appended claims.

It is to be understood that the description in the present specification is merely illustrative and is not intended to limit the scope of the claims or the application of the present disclosure by no means.

Advantageous Effects of Invention

With the technique of the present disclosure, it is possible to perform the electrophoresis analysis using various separation media having any refractive index in the range of $1.33 \leq n_3 \leq 1.41$ in the capillary-array-electrophoresis device. In particular, it becomes possible to perform capillary-electrophoresis analysis using a separation medium having a low refractive index, which is the same as or close to a refractive index 1.33 of water. This makes it possible to greatly expand an application range of the capillary-array-electrophoresis device capable of improving an analysis throughput and reducing an analysis cost per sample.

Other objects, configurations, and effects which have not been described above become apparent from embodiments to be described hereinafter.

6

Figure 6:
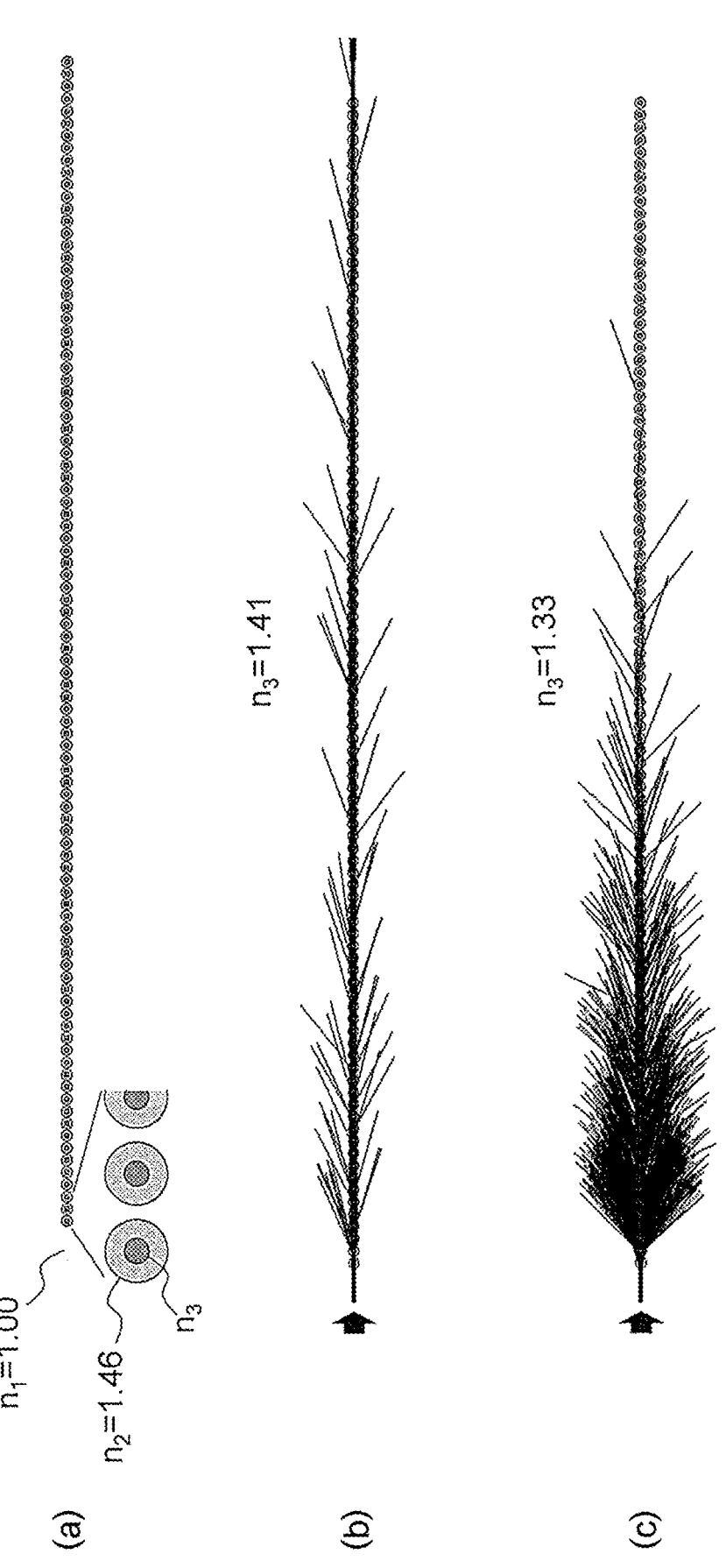

FIG. 6 is a view illustrating a configuration of a capillary array based on PTL 2 and laser-beam ray tracing results.

Figure 7:
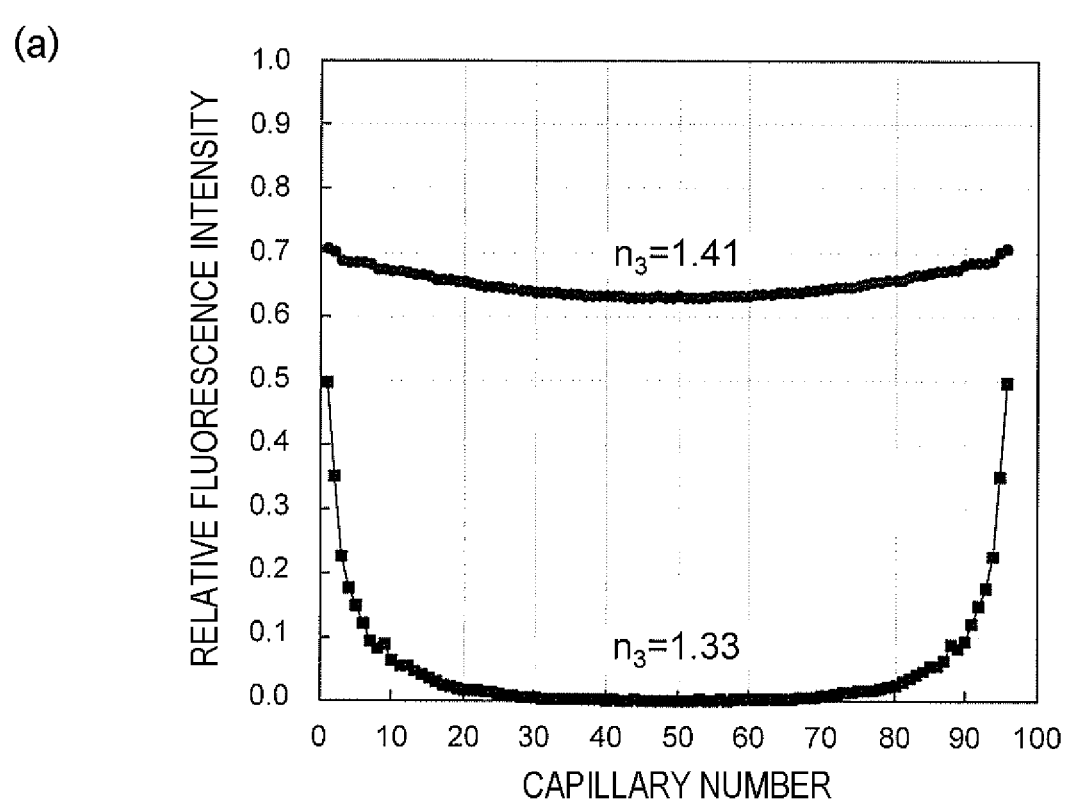
Figure 7:
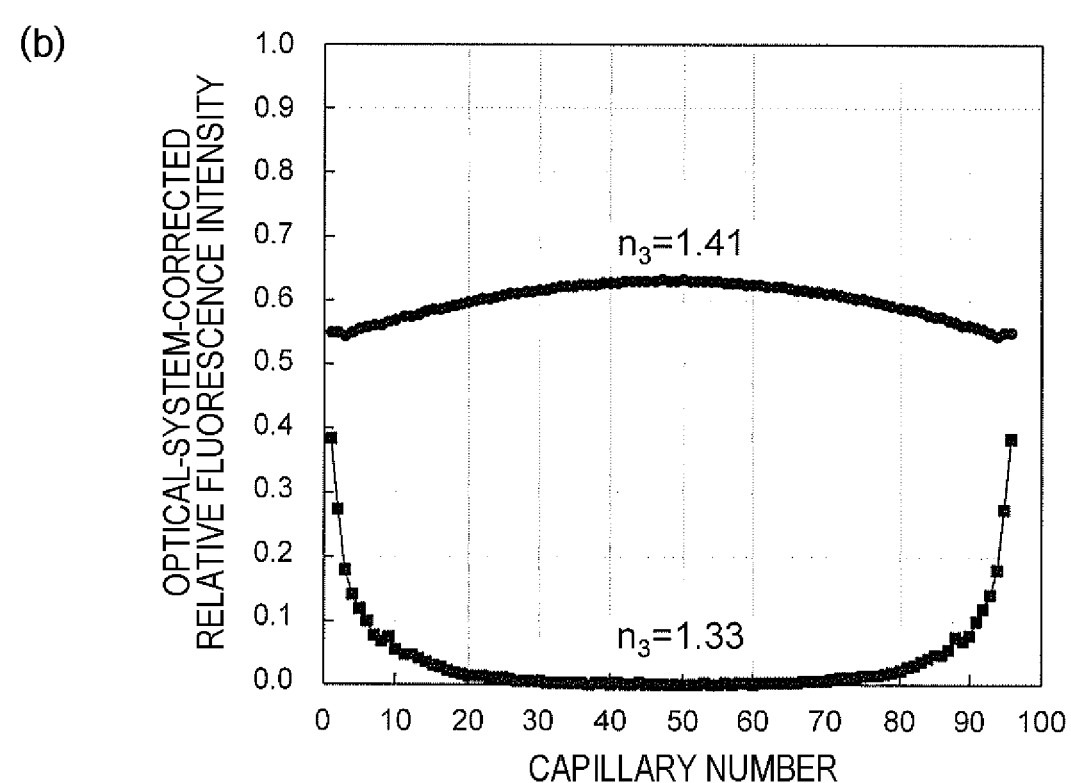

FIG. 7 is a view illustrating relative fluorescence intensity distributions in the capillary array based on PTL 2.

Figure 8:
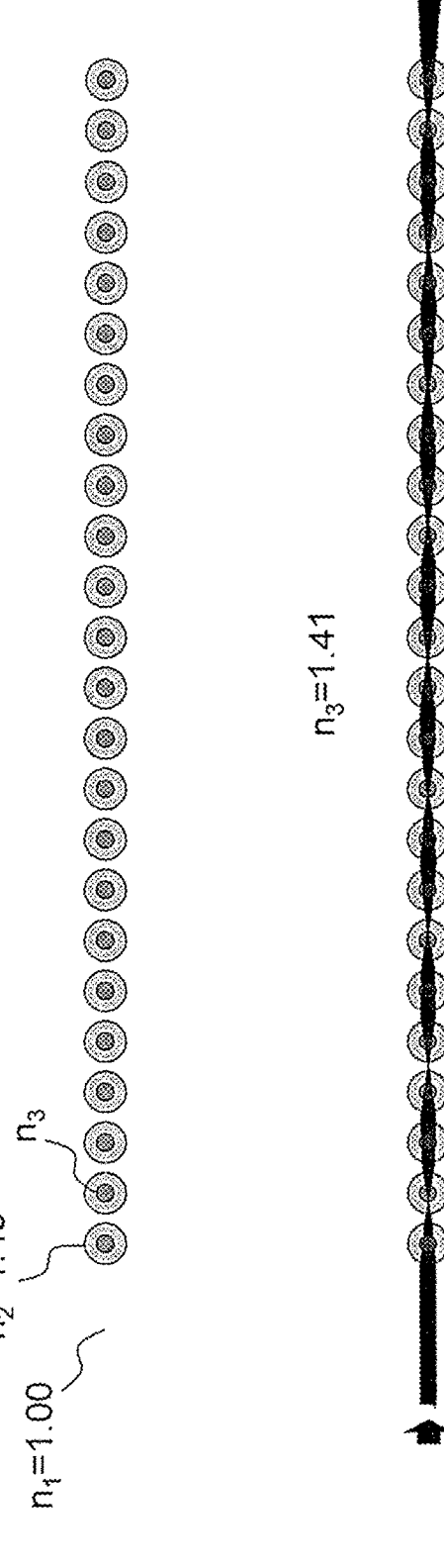
Figure 8:
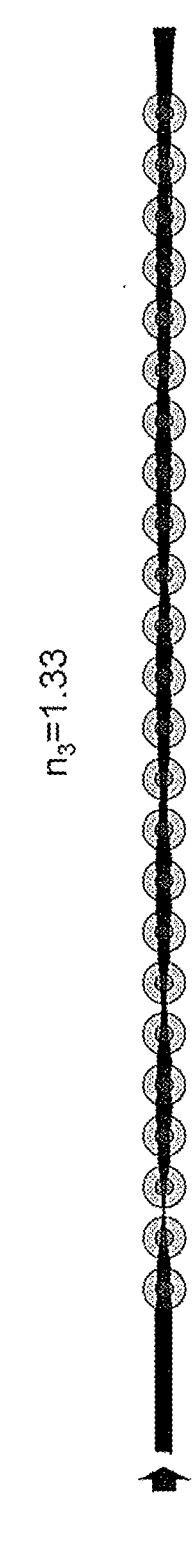

FIG. 8 is a view illustrating a configuration of a capillary array of the present disclosure and laser-beam ray tracing results.

Figure 9:
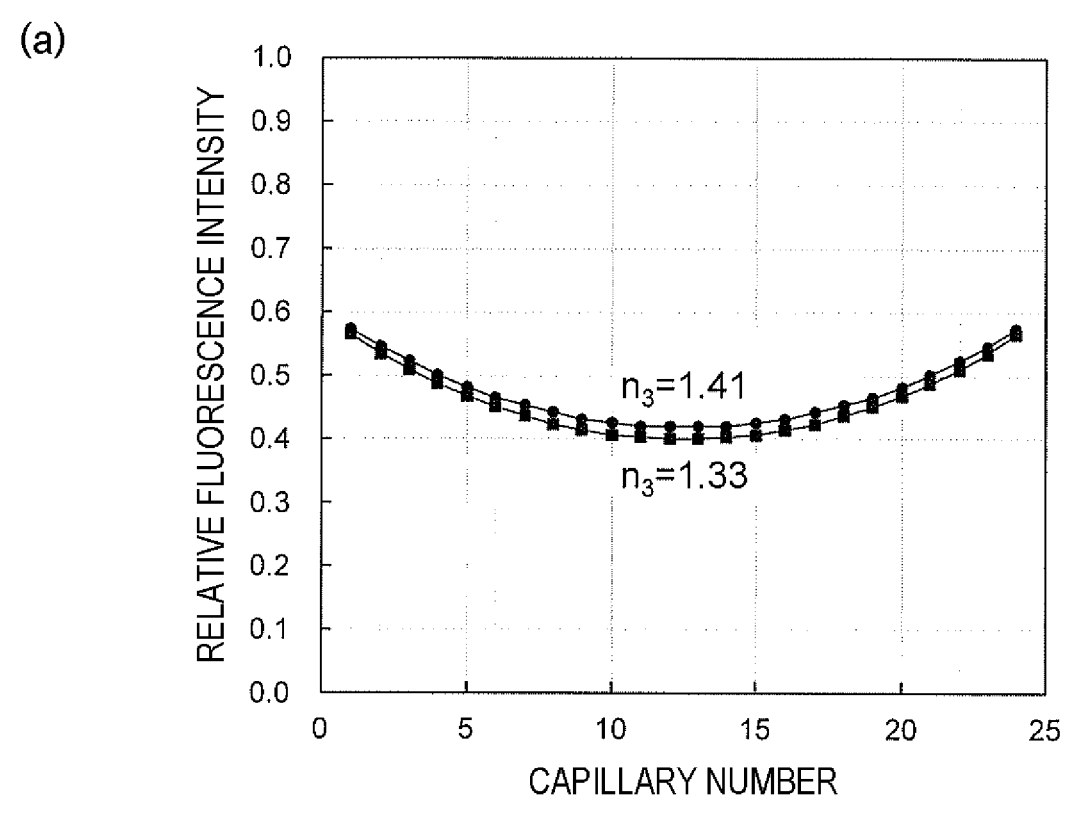
Figure 9:
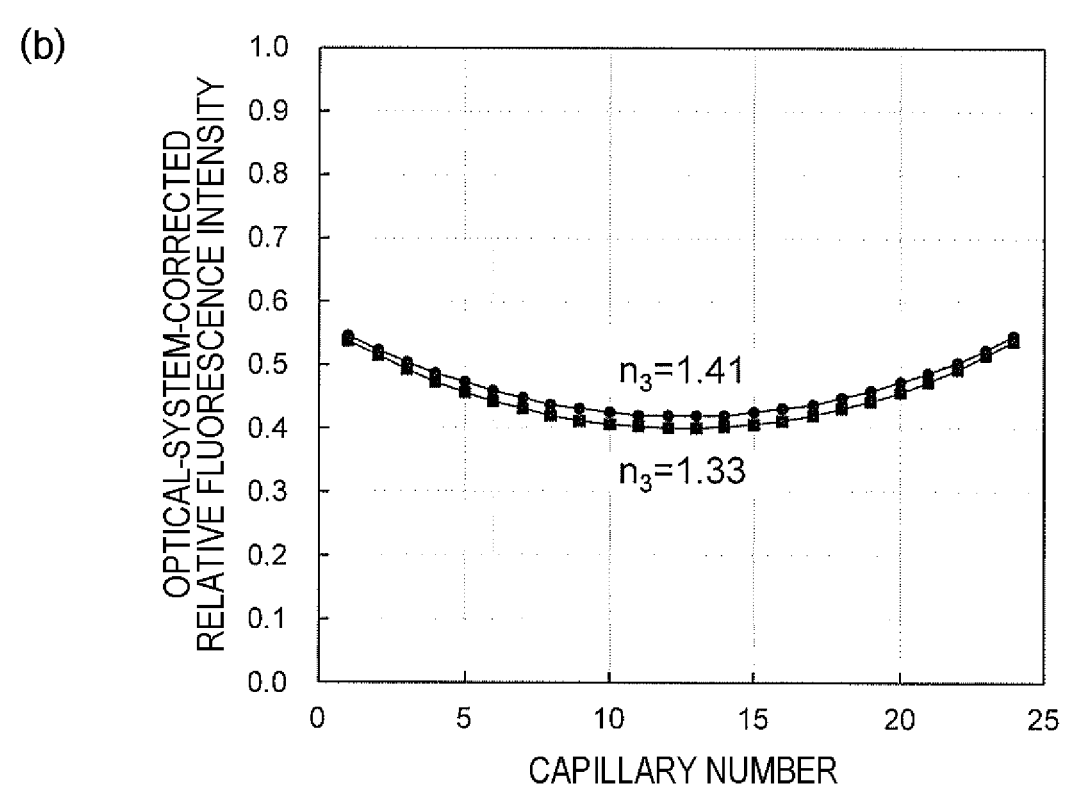

FIG. 9 is a view illustrating relative fluorescence intensity distributions in the capillary array of the present disclosure.

Figure 10:
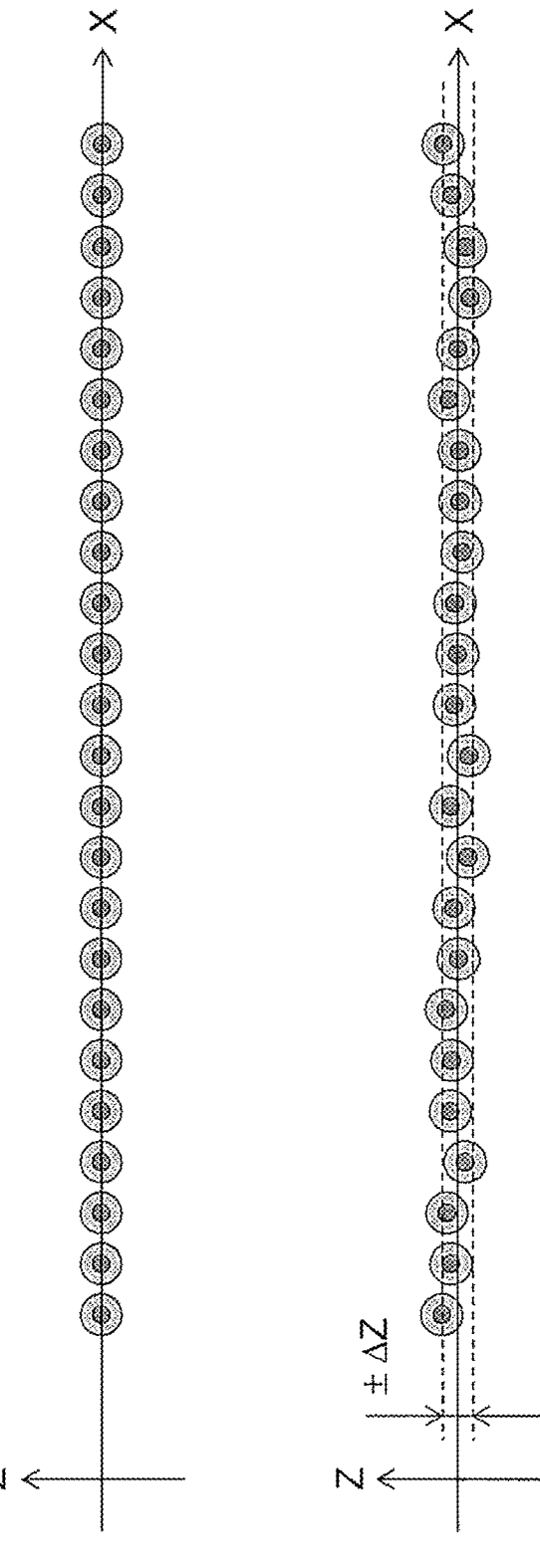

FIG. 10 is a view for describing a definition of array-plane error $\Delta Z$ of the capillary array.

Figure 11:
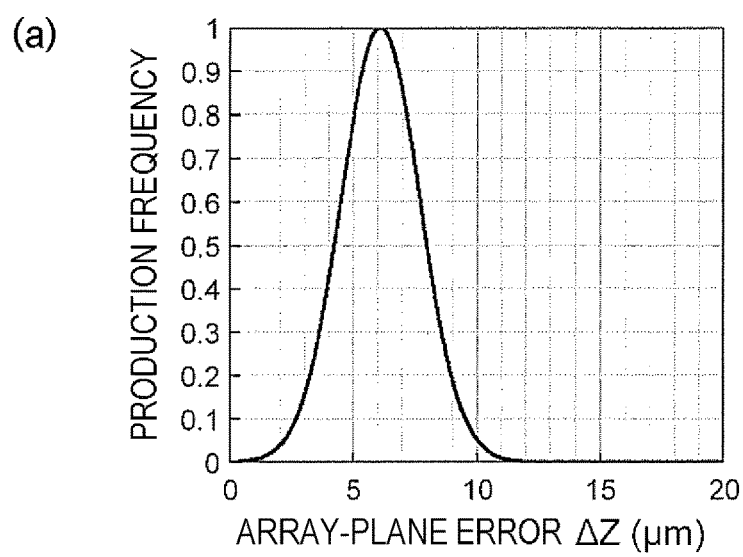
Figure 11:
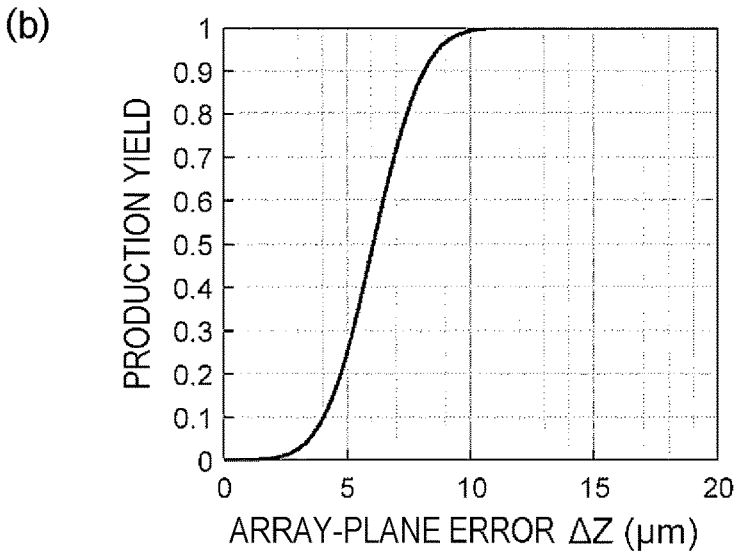
Figure 11:
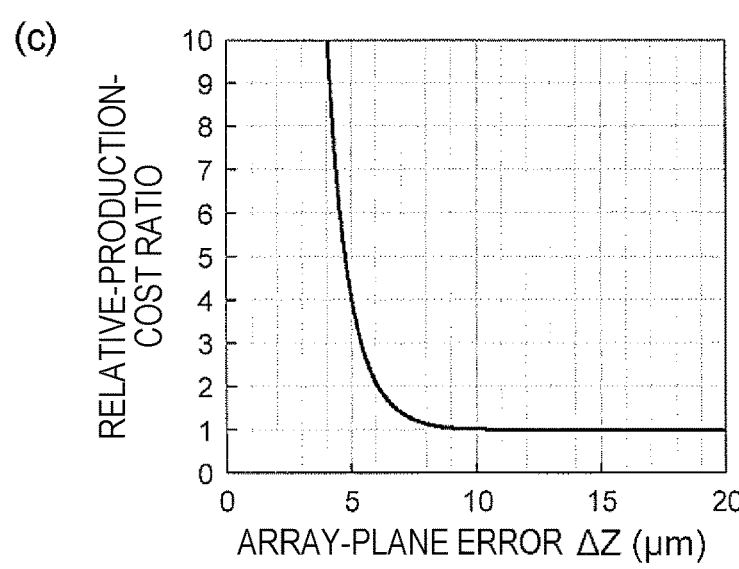

FIG. 11 is a view for describing a relationship between array-plane error $\Delta Z$ and relative production cost of the capillary array.

Figure 12:
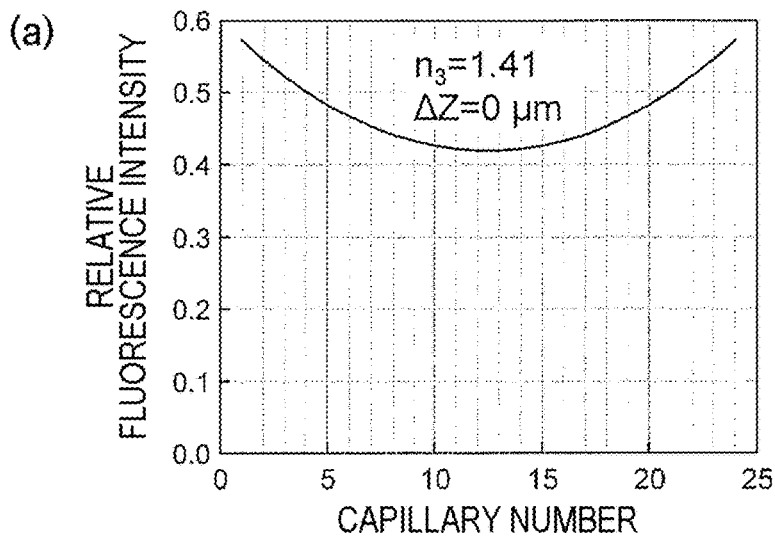
Figure 12:
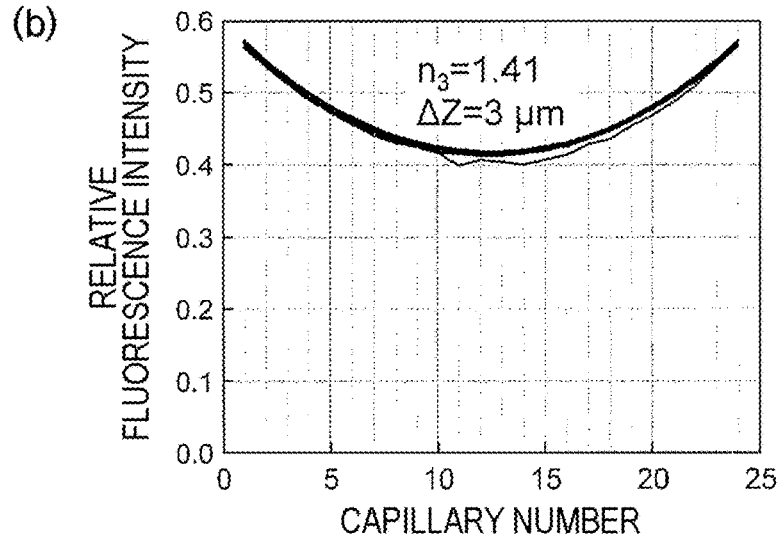
Figure 12:
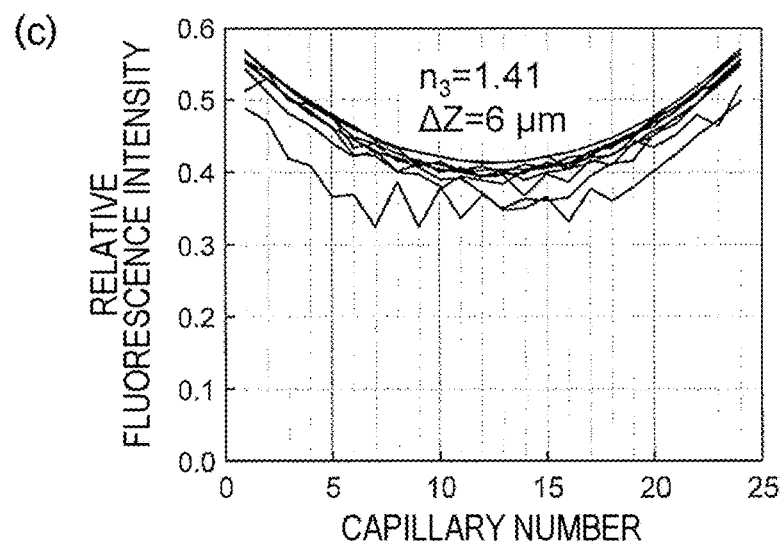

FIG. 12 is a view illustrating relative fluorescence intensity distributions in the capillary array with array-plane error $\Delta Z$ as a parameter ($n_3=1.41$).

Figure 13:
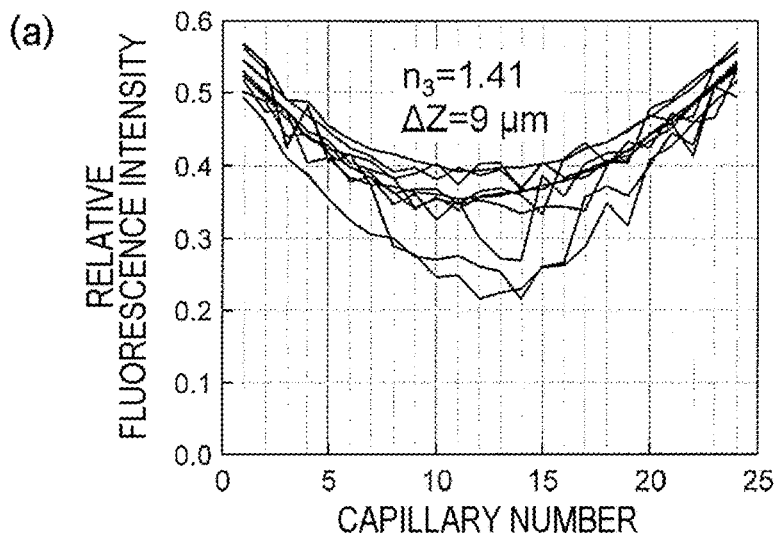
Figure 13:
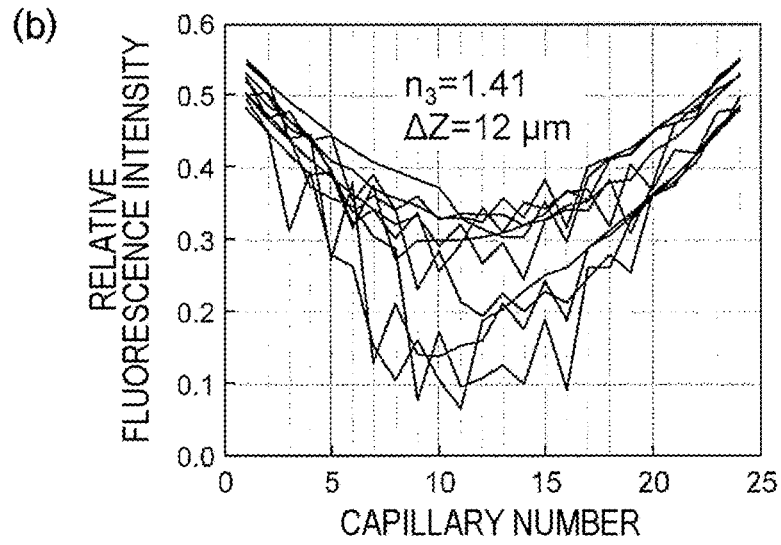
Figure 13:
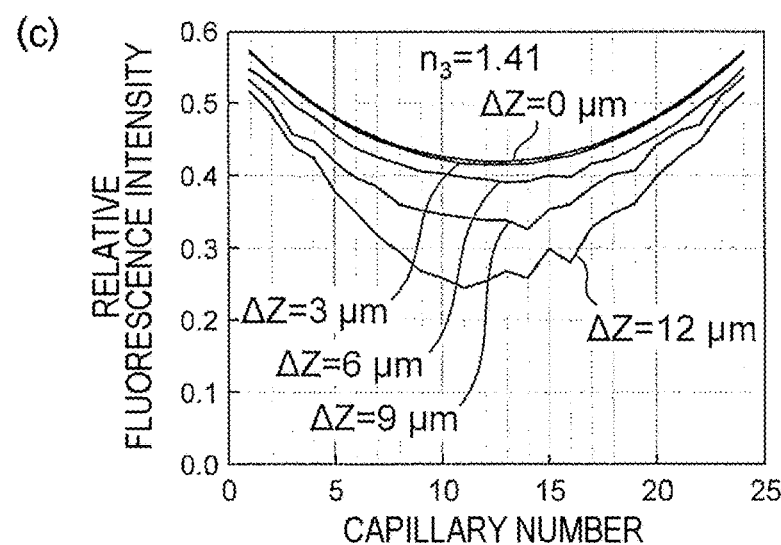

FIG. 13 is a view illustrating relative fluorescence intensity distributions in the capillary array with array-plane error $\Delta Z$ as a parameter ($n_3=1.41$).

Figure 14:
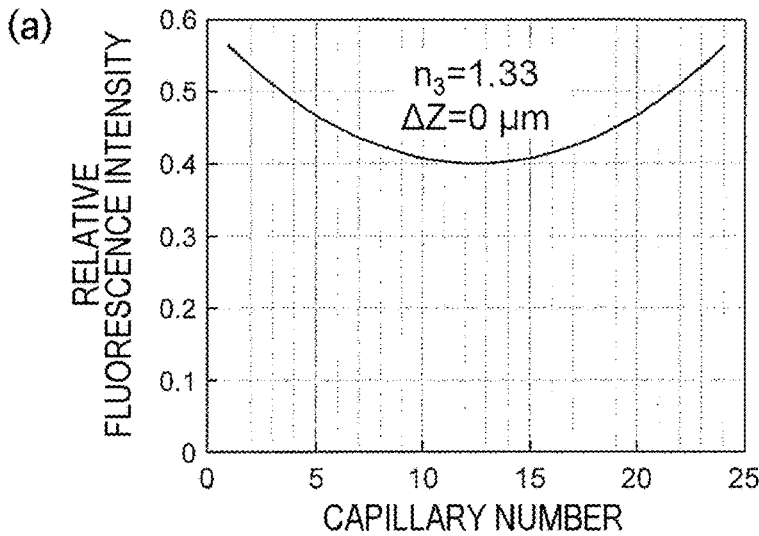
Figure 14:
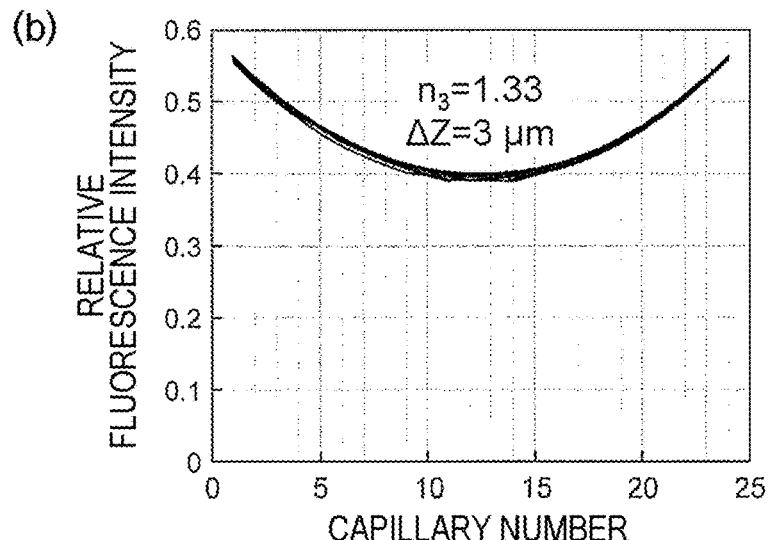
Figure 14:
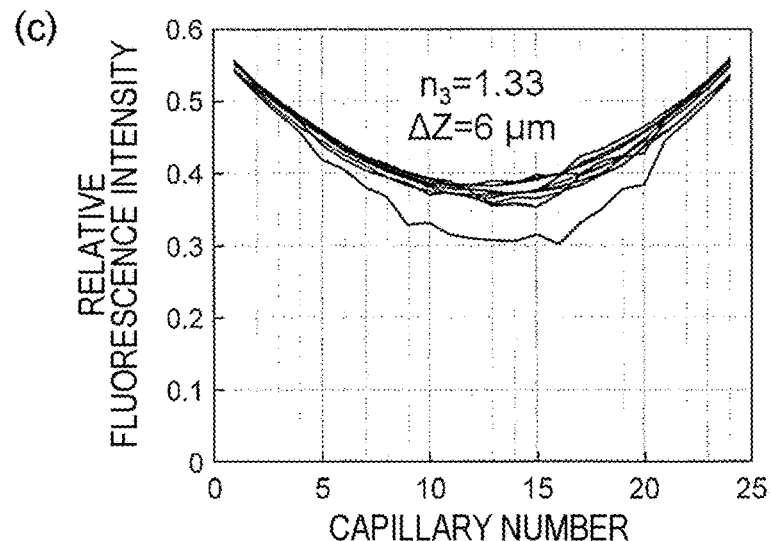

FIG. 14 is a view illustrating relative fluorescence intensity distributions in the capillary array with array-plane error $\Delta Z$ as a parameter ($n_3=1.33$).

Figure 15:
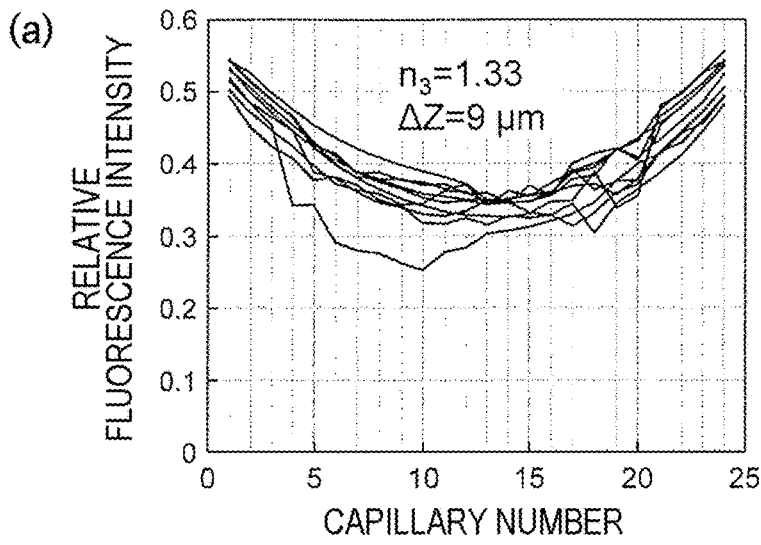
Figure 15:
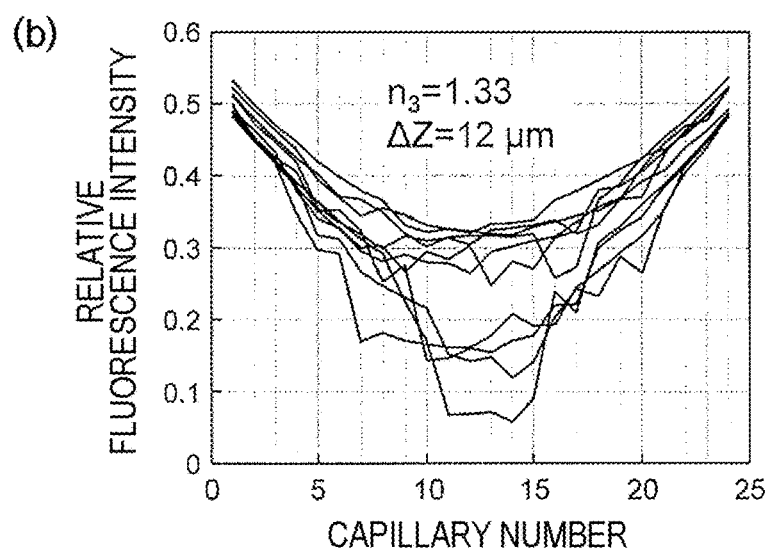
Figure 15:
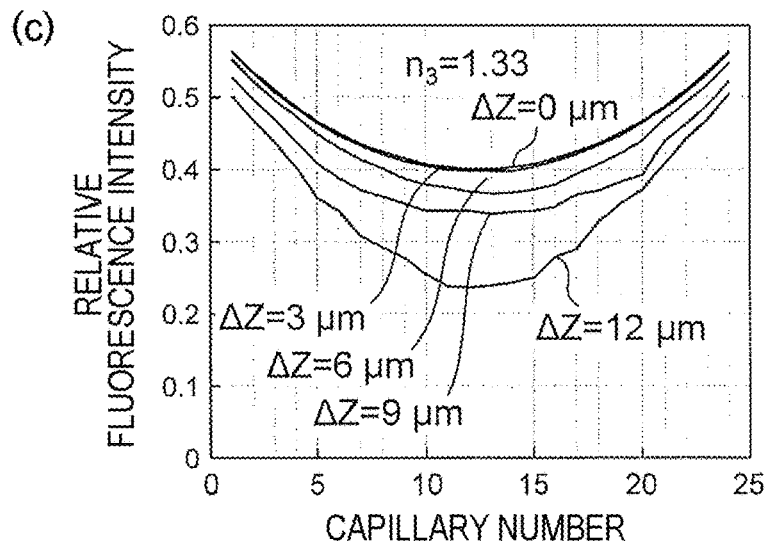

FIG. 15 is a view illustrating relative fluorescence intensity distributions in the capillary array with array-plane error $\Delta Z$ as a parameter ($n_3=1.33$).

Figure 16:
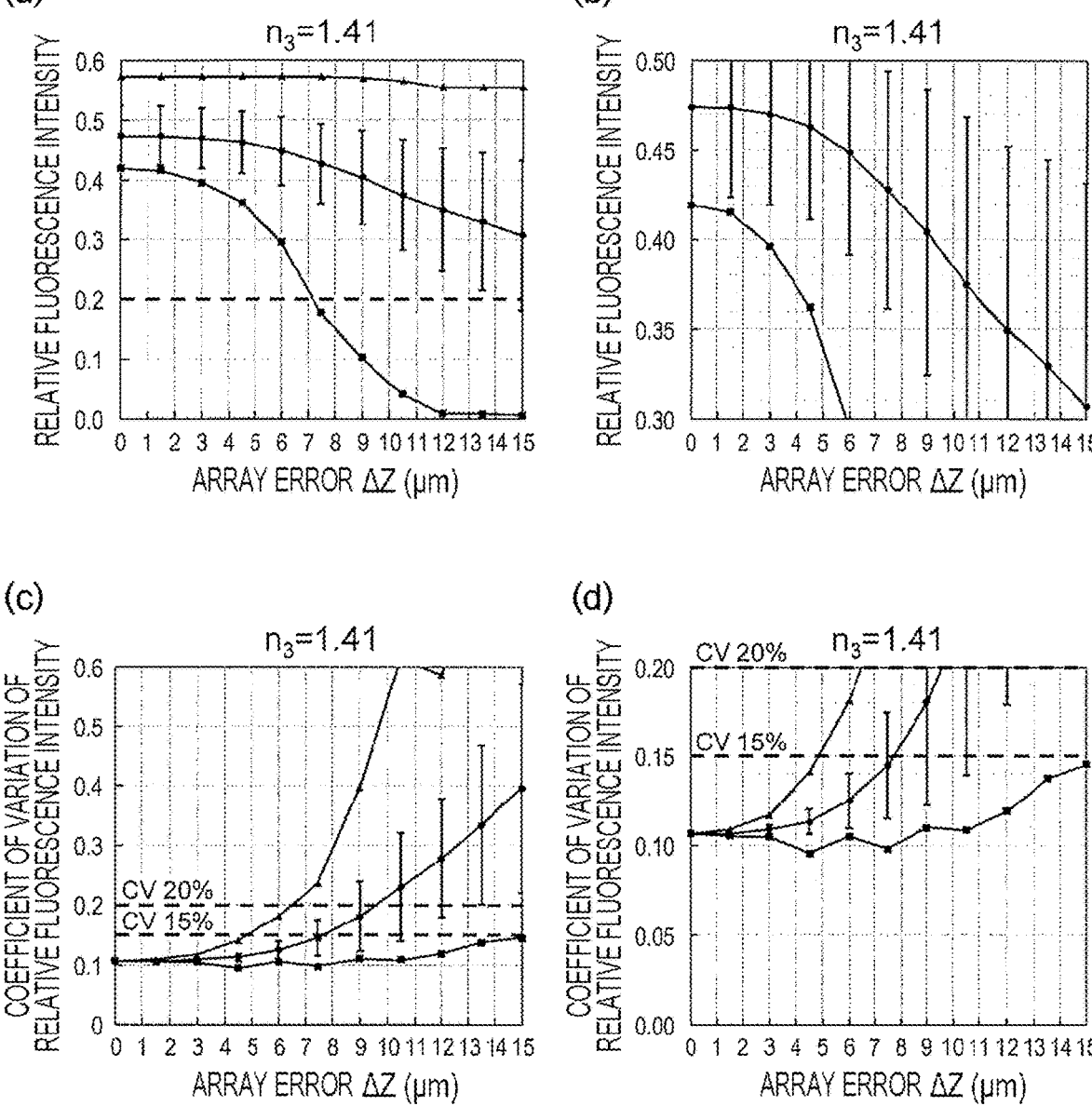

FIG. 16 is a view illustrating relationships between array-plane error $\Delta Z$ and relative fluorescence intensity of the capillary array, and between array-plane error $\Delta Z$ and coefficient of variation of relative fluorescence intensity of the capillary array ($n_3=1.41$).

Figure 17:
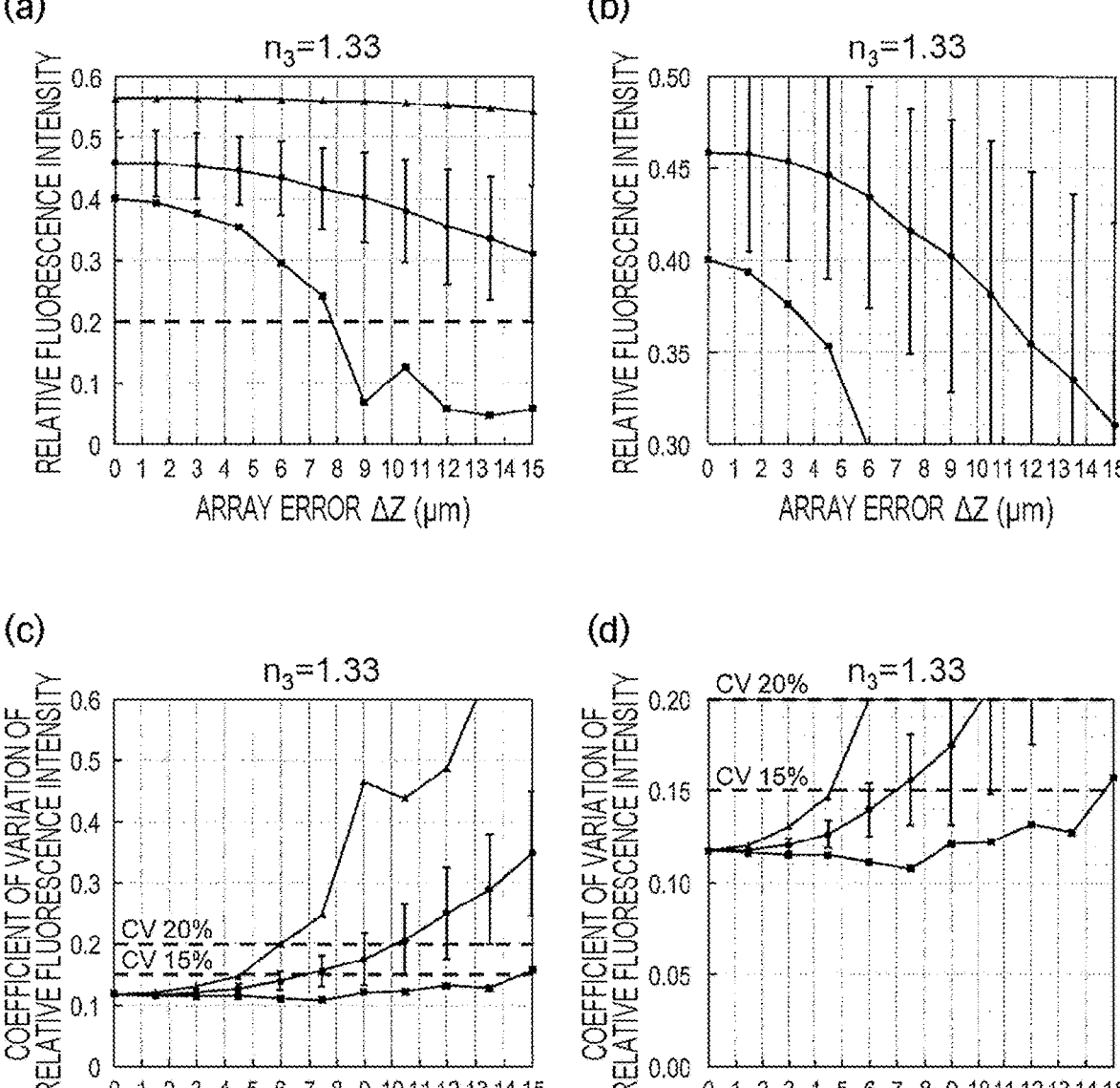

FIG. 17 is a view illustrating relationships between array-plane error $\Delta Z$ and relative fluorescence intensity of the capillary array, and between array-plane error $\Delta Z$ and coefficient of variation of relative fluorescence intensity of the capillary array ($n_3=1.33$).

Figure 18:
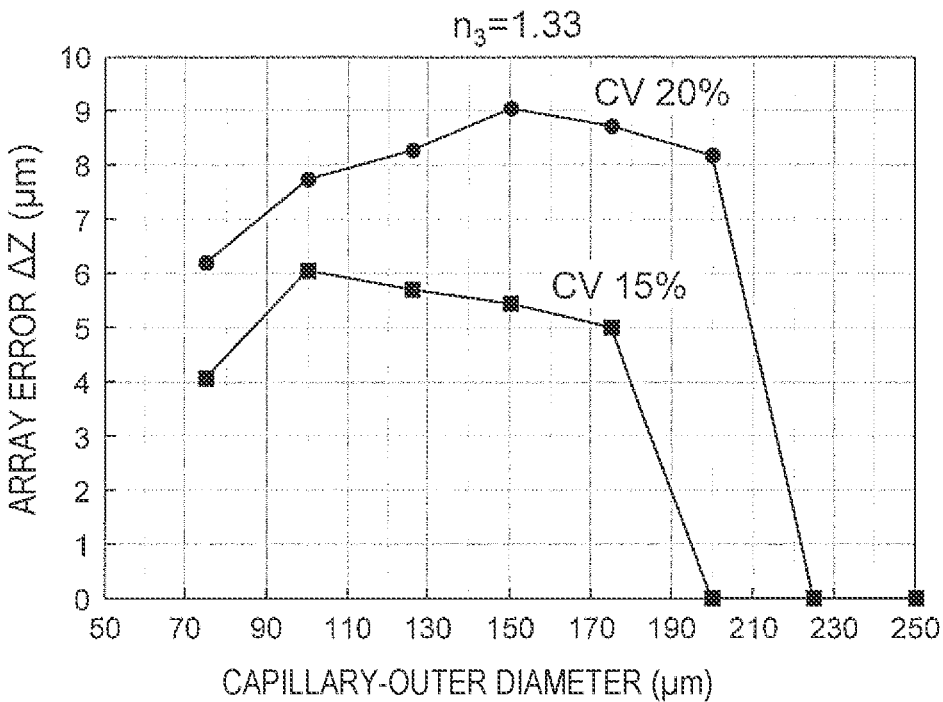

FIG. 18 is a view illustrating relationships between outer diameter of a capillary and array-plane error $\Delta Z$ where CV equals 15% and 20%.

DESCRIPTION OF EMBODIMENTS

A technique of the present disclosure relates to a capillary-array-electrophoresis device that simultaneously analyzes a plurality of samples by simultaneously irradiating a plurality of capillaries with a laser beam and simultaneously detecting fluorescence emitted from each of the capillaries during electrophoresis using the plurality of capillaries.

(A) Outline of Technique of Present Disclosure

The present disclosure mainly proposes a technique for enabling to use a separation medium having a low refractive index equivalent to a refractive index 1.33 of water or having a refractive index of less than 1.36. In a case where such a separation medium having a low refractive index is used, since multiple laser-beam focusing does not function even if any technique disclosed in known examples (PTLs 1 and 2, and NPL 1) is used, it is difficult to perform simultaneous irradiation of a plurality of capillaries with a laser beam.

Further, the present disclosure also proposes a technique for enabling to perform capillary-electrophoresis analysis using not only the separation medium having a low refractive index as described above but also a separation medium having a high refractive index, typically, a separation medium having a refractive index of 1.36 or more and 1.42 or less. A maximum number of capillaries that can be simultaneously irradiated is preferably larger, and may be 8 or more, or 24 or more depending on a situation. Among irradiation intensities and fluorescence intensities of the plurality of capillaries in the same capillary array, the lowest irradiation intensity and fluorescence intensity are preferably higher. A fluorescence intensity expected when a total intensity of a laser beam emitted from a laser-light source irradiates the inside of one capillary is set to 1. It is empirically known that practical sensitivity can be obtained when a minimum value MIN (Minimum) of the fluorescence intensity satisfies MIN≥0.2. Further, a variation in the irradiation intensity and fluorescence intensity between the plurality of capillaries in the same capillary array is preferably smaller. It has been empirically known that different samples can be analyzed under equivalent conditions when a coefficient of variation CV in the irradiation intensity and fluorescence intensity is set such that CV≤20% or that CV≤15% depending on a situation. The present disclosure aims to satisfy such practical performances of the capillary-array-electrophoresis device.

As a result of intensive studies for the above-described problem, it has been found that each of the capillaries exhibits a convex lens function and the multiple laser-beam focusing functions since $\Delta\theta=-3.2°$ is obtained from Formula (1) when a capillary outer diameter 2R=126 μm, a capillary inner diameter 2r=50 μm, the outside of each capillary is air and has $n_1=1.00$, a capillary material is quartz glass and has $n_2=1.46$, and the inside of each capillary is a separation medium and has $n_3=1.33$ in the capillary array. In the 3500 Series Genetic Analyzer based on PTL 1 described above, a difference from the above case of $n_3=1.33$ is that the outer diameter 2R of each capillary is reduced from 323 μm to 126 μm. As a result, a concave lens function of each of the capillaries is converted into the convex lens function.

Based on further studies, it has been found that $\Delta\theta<0$ is obtained if the capillary outer diameter 2R is 220 μm or less so that the convex lens function is obtained. When generalizing the convex lens condition without limiting the capillary inner diameter to 2r=50 μm, it has been found that $\Delta\theta<0$ is obtained when R/r≤4.4 so that the convex lens function is obtained. A separation medium having a low refractive index of $n_3=1.33$ is not studied in PTL 1. That is, the above is a condition found for the first time with the technique of the present disclosure.

Further, in a case where the capillary outer diameter is set to 2R=126 μm and the capillary inner diameter is set to 2r=50 μm, it has been found that $\Delta\theta=-3.5°$, $-3.8°$, and $-4.2°$ are obtained according to Formula (1) when a refractive index of the separation medium inside each capillary is $n_3=1.34$, 1.35, and 1.36, respectively, so that each of the capillaries exhibits the convex lens function and the multiple laser-beam focusing functions. Based on further studies, it has been found that the convex lens function is obtained since $\Delta\theta<0$ is satisfied if the outer diameter 2R of each capillary is 240 μm or less, 264 μm or less, and 293 μm or less. When generalizing the convex lens condition, it has been found that $\Delta\theta<0$ is obtained when R/r≤4.8, R/r≤5.3, and R/r≤5.9 are satisfied so that the convex lens function is obtained. That is, it has been found that it is preferable to satisfy R/r<5.9 when a separation medium having a low refractive index of less than 1.36 is used. Such a separation medium having a low refractive index is not studied in PTL 1. That is, these conditions were found for the first time by the technique of the present disclosure.

Conducting experiments under the above-described conditions having the convex lens function, it has been found that there are cases where it is not always possible to realize simultaneous irradiation of the plurality of capillaries with a laser beam, that is, the multiple laser-beam focusing does not always function. Conducting detailed studies, it has been turned out that an array-plane error of the capillary array adversely affects a performance of the multiple laser-beam focusing. In the present specification, an array-plane error $\Delta Z$ is defined as follows. First, it is assumed that Z axis is set in a direction perpendicular to an array plane and that the array plane is located at Z=0 μm. Further, a median value of Z-coordinates of central axes of the plurality of capillaries in laser-irradiation portions is set to zero. Then, an absolute value of the Z-coordinate of the central axis of the capillary farthest from the array plane is defined as $\Delta Z$. Therefore, the Z-coordinates of the central axes of the capillaries are dispersed within a range of $\pm\Delta Z$.

PTL 1 assumes that there is no array-plane error, that is, $\Delta Z=0$ μm. However, it is practically not possible to produce a capillary array having $\Delta Z=0$ μm. Therefore, there are cases where theory and experimental results differ as described above. It is obvious that the adverse effect on the multiple laser-beam focusing performance decreases as the array-plane error $\Delta Z$ of the capillary array is smaller. However, production of a capillary array having a smaller array-plane error $\Delta Z$ requires a higher cost. Therefore, it is necessary to quantitatively clarify a tolerance of the array-plane error $\Delta Z$ of the capillary array in order to obtain the required multiple laser-beam focusing performance.

PTL 2 provides a configuration different from the ones of PTL 1 and the technique of the present disclosure in that the outside of capillaries is not air ($n_1=1.00$) but a fluorine solution ($n_1=1.29$). PTL 2 describes that $\Delta Z=6$ μm in the specification. However, since PTL 2 does not teach a relationship between an array-plane error and a multiple laser-beam focusing performance, a condition of the array-plane error for satisfying a target performance is unknown. Further, it is also unknown whether or not $\Delta Z=6$ μm is a condition for satisfying the target performance (the relationship between the $\Delta Z$ and the performance is not clearly described).

NPL 1 provides a configuration different from the ones of PTL 1 and the technique of the present disclosure in that the outside of capillaries is not air ($n_1=1.00$) but a matching solution ($n_1=1.46$) and that analysis capillaries and lens capillaries are alternately arrayed. NPL 1 describes that an acceptable array-plane error is $\Delta Z\leq0.3$ μm in the specification. Here, it is assumed that a maximum value $\Delta Z$ of the array-plane error is three times a standard deviation $\sigma$ of the array-plane error distribution ($\Delta Z=3\sigma$). However, it is extremely difficult to produce a capillary array having $\Delta Z\leq0.3$ μm. Further, there is a possibility that a production cost increases even if such a capillary array can be produced.

Based on the discussion above and systematical studies of the relationship between the array-plane error $\Delta Z$ and the multiple laser-beam focusing performance and the relationship between the array-plane error $\Delta Z$ and the production cost of the capillary array, the technique of the present disclosure will clarify conditions for causing the multiple laser-beam focusing to function in the capillary array using the separation medium having a low refractive index. That is, in the capillary-array-electrophoresis device using the separation medium having a low refractive index, the present disclosure will derive conditions such as a refractive index of a medium outside the capillary array, an outer diameter and an inner diameter of the capillaries, and an array-plane error for obtaining a target multiple laser-beam focusing performance while keeping the production cost of the capillary array within an acceptable range. In general, the production cost increases as a production yield decreases. Taking a production cost when the production yield is 100% as a reference-production cost, the acceptable range is a production cost of about twice to three times the reference-production cost.

Specifically, in order to make a variation in laser-beam-irradiation efficiency of the capillaries CV≤20% while keeping the production cost of the capillary array within twice the reference-production cost in a 24-capillary-array-electro-phoresis device, it is preferable to satisfy $n_1=1.00$, $n_2=1.46$, $n_3=1.33$, $2R=100$ to $200$ μm, $2r=50$ μm ($R/r=2$ to 4), and $\Delta Z=9$ μm. Alternatively, in order to make a variation in laser-beam-irradiation efficiency of the capillaries CV≤15% while keeping the production cost of the capillary array within twice the reference-production cost in a 24-capillary-array-electrophoresis device, it is preferable to satisfy $n_1=1.00$, $n_2=1.46$, $n_3=1.33$, $2R=100$ to $175$ μm, $2r=50$ μm ($R/r=2$ to 4), and $\Delta Z=6$ μm.

Hereinafter, each of the embodiments of the present disclosure will be described in detail. Note that the respective embodiments will be separately described below, but techniques described in the respective embodiments are not exclusive and can be combined with each other as appropriate.

(B) First Embodiment

Configuration Example of Capillary-Array-Electrophoresis Device

Figure 1:
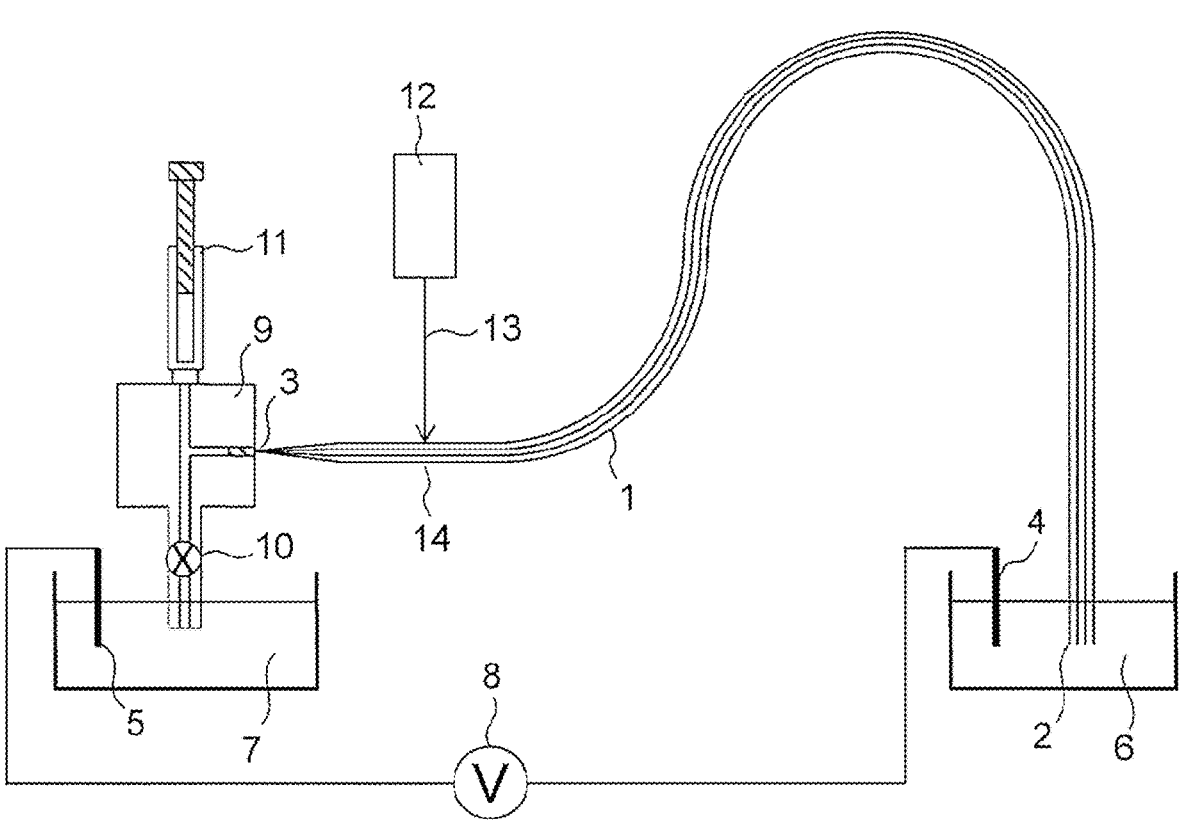
FIG. 1 is a diagram illustrating a configuration example of a capillary-array-electrophoresis device.

FIG. 1 is a diagram illustrating a configuration example of a capillary-array-electrophoresis device. This capillary-array-electrophoresis device performs double-stranded DNA fragment analysis in addition to DNA sequencing and single-stranded DNA fragment analysis performed in the conventional capillary-array-electrophoresis devices. The present embodiment uses 24 capillaries (however, only four capillaries are illustrated in FIG. 1) to perform DNA sequencing of different samples in each of the capillaries first and then to perform double-stranded DNA fragment analysis of different samples in each of the capillaries. The samples of DNA sequencing include single-stranded DNA fragments having various lengths and labeled with four kinds of fluorophores corresponding to four kinds of bases. Further, an electrophoretic separation medium, filled in each of the capillaries when performing DNA sequencing, is a polymer solution containing 8 M urea as a denaturant. Its refractive index is $n_3=1.41$. On the other hand, the samples of the double-stranded DNA fragment analysis include double-stranded DNA fragments having various lengths and labeled with two kinds of fluorophores. The double-stranded DNA fragments labeled with one fluorophore are PCR products. The double-stranded DNA fragments labeled with the other fluorophore are size markers. An electrophoretic separation medium, filled in each of the capillaries when performing the double-stranded DNA fragment analysis, is a polymer solution not containing urea as a denaturant. Its refractive index is $n_3=1.33$. One analysis session was performed by the following steps (i) to (vi).

(i) First, sample-injection ends 2 of 24 capillaries 1 were immersed in a cathode-side-buffer solution 6. Sample-elution ends 3 were connected to an anode-side-buffer solution 7 via a polymer solution in a polymer block 9.

(ii) Next, a valve 10 of the polymer block 9 was closed. Then, the internal polymer solution was pressurized by pushing down a piston of a syringe 11 connected to the polymer block 9 to fill the inside of each of the capillaries 1 with the polymer solution from the sample-elution ends 3 toward the sample-injection ends 2.

(iii) Subsequently, the valve 10 was opened. Different samples were injected into the respective capillaries 1 from the sample-injection ends 2 by electrokinetic injection. Thereafter, a high voltage was applied between a cathode 4 and an anode 5 by a power supply 8 to start capillary electrophoresis. DNA fragments labeled with a plurality of types of fluorophores were electrophoresed from the sample-injection ends 2 toward the sample-elution ends 3.

(iv) In parallel, laser-irradiation portions 14 were collectively irradiated with a laser beam 13 emitted from a laser-light source 12 by a multiple laser-beam focusing technique. Here, a position of each of the capillaries 1 a certain electrophoretic distance away from the sample-injection end 2 was defined as a laser-irradiation portion 14. The laser-irradiation portions 14 were collectively irradiated with a laser beam 13 emitted from a laser-light source 12 by the multiple laser-beam focusing technique. Coatings of the respective capillaries 1 around the laser-irradiation portions 14 were removed in advance. Respective capillaries 1 near the laser-irradiation portions 14 were arrayed on an array plane. The laser beam 13 was focused and then incident along the array plane from the side of the array plane. Although FIG. 1 depicts that one-side irradiation of the laser beam 13 is performed for the sake of simplicity, both-side irradiation was actually performed by dividing the laser beam 13 into two beams.

(v) Then, when the DNA fragments labeled with the plurality of kinds of fluorophores were electrophoresed inside the respective capillaries 1 and the DNA fragments passed through the laser-irradiation portions 14, the labeled fluorophores were excited by the irradiation with the laser beam 13 to emit fluorescence. That is, the plurality of kinds of fluorophores emitted fluorescence from 24 light-emission points (laser-irradiation portions). Fluorescence intensities thereof changed from moment to moment with the electrophoresis.

(vi) Finally, the samples injected into the respective capillaries were analyzed by detecting multiple colors of fluorescence emitted from each of the light-emission points and then obtaining time-series data.

The above steps (i) to (vi) are common to a case of performing DNA sequencing and a case of performing double-stranded DNA fragment analysis. The polymer solution and the buffer solution are appropriately changed. That is, the capillary-array-electrophoresis device of the present embodiment can switch and execute a plurality of analysis modes having different conditions including, for example, a first analysis mode for the double-stranded DNA fragment analysis and a second analysis mode for the DNA sequencing. In each of the analysis modes, it is effective to appropriately change conditions of the electrophoresis analysis according to each purpose. The changeable conditions of the electrophoresis analysis include control temperature of the capillaries, an electric-field intensity during electrophoresis, an electric-field intensity during sample injection and a sample-injection time, a laser-irradiation intensity, a sensor-exposure time, and the like. It is effective to change the control temperature in each of the analysis modes, for example, by adjusting the temperature of the capillary to 30° C. in the first analysis mode and adjusting the temperature of the capillary to 60° C. in the second analysis mode, or the like. Note that the terms "first" and "second" are merely used for convenience to distinguish between the analysis modes and the terms do not indicate the order in which the analysis modes are executed. In the above-described example, a refractive index of an electrophoretic separation medium in the DNA fragment analysis is $n_3$=1.33. A refractive index of an electrophoretic separation medium in the DNA sequencing is $n_3$=1.41. Therefore, the refractive index of the electrophoretic separation medium in the first analysis mode is $n_3$<1.36. The refractive index of the electrophoretic separation medium in the second analysis mode is $n_3 \geq 1.36$. Further, an analysis session including the steps (i) to (vi) can be repeated a plurality of times. For example, it is possible to analyze a large number of different samples by analyzing Samples 1 to 24 in a first analysis session and analyzing Samples 25 to 48 in a second analysis session, and so on. Therefore, the DNA sequencing may be repeated using the same polymer solution and buffer solution, or may be switched to the double-stranded DNA fragment analysis in the middle. Any application can be selected in any analysis session.

Configuration Example of Optical System for Fluorescence Detection

Figure 2:
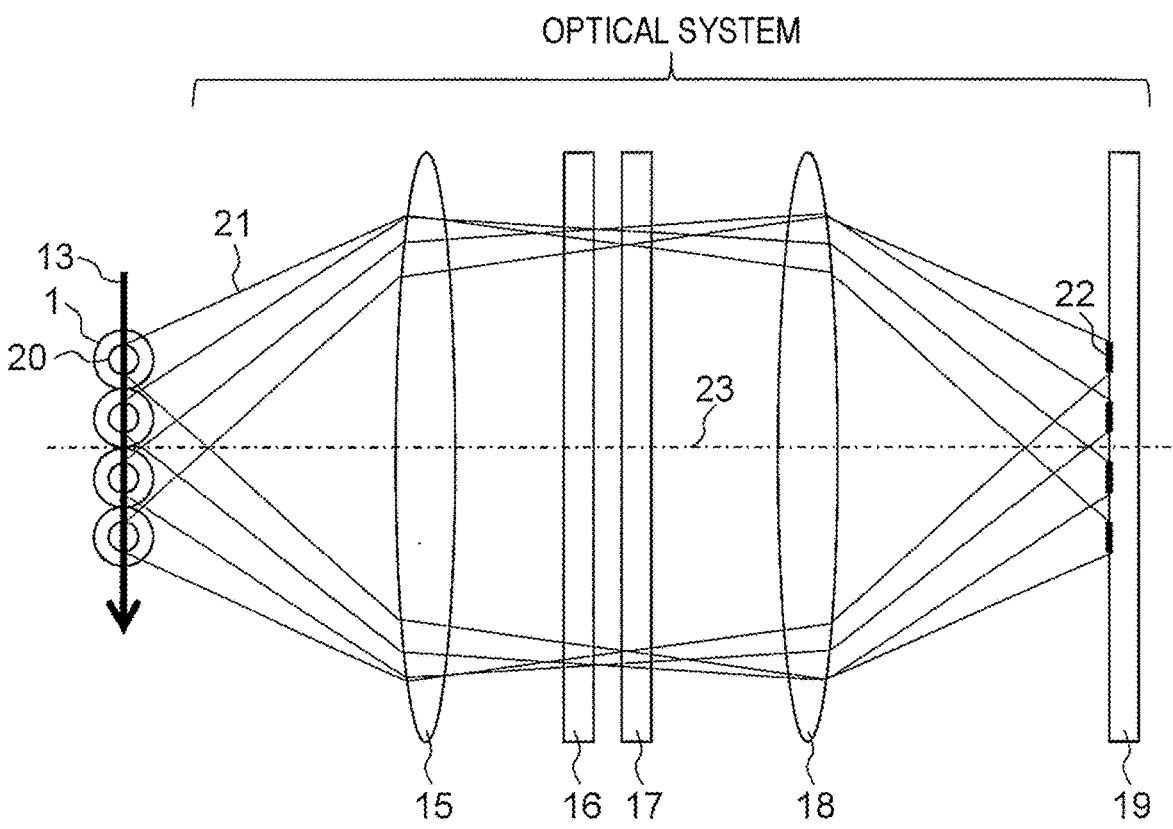
FIG. 2 is a diagram illustrating a configuration example of an optical system of the capillary-array-electrophoresis device.

FIG. 2 is a cross-sectional view illustrating a configuration example of an optical system that performs fluorescence detection in the capillary-array-electrophoresis device. The present optical system is located on the back side of the laser-irradiation portions 14 in FIG. 1. Although FIG. 2 depicts one-side irradiation of a four-capillary array, both-side irradiation of the 24-capillary-arrays was actually performed, which is similar to FIG. 1. The capillaries 1 arrayed on the array plane were simultaneously irradiated by the laser beam 13 by the multiple laser-beam focusing. The laser-irradiation portions 14 of the capillaries 1 serve as light-emission points 20 of fluorescence. Emitted fluorescence 21 from each of the light-emission points 20 was collimated collectively by a condenser lens 15 A light of the laser beam was blocked by a laser-cut filter 16 and transmitted through a transmissive-diffraction grating 17 to be wavelength-dispersed in a direction of a central axis of each of the capillaries. An imaging point 22 was formed on a sensor 19 by an imaging lens 18. The sensor 19 may be an area sensor such as a CCD or a CMOS, a photodiode array, or the like as long as a plurality of the imaging points 22 can be simultaneously measured. The respective imaging points 22 are actually wavelength-dispersed in a depth direction in FIG. 2, but a single wavelength part of each of the imaging points 22 is schematically depicted in FIG. 2.

In such an optical system, light-collection efficiency of a light from a light-emission point decreases as the light-emission point is farther from an optical axis 23 of the optical system. This is because a collection angle of an emitted fluorescence 21 from a light-emission point 20 farther from the optical axis 23 becomes smaller due to a vignetting effect of the optical system as illustrated in FIG. 2. Therefore, even if fluorescence of equal intensity is emitted from each of the light-emission points 20, as a light-emission point 20 is farther from the optical axis 23, a fluorescence intensity of the corresponding imaging point 22 decreases. The degree of the vignetting effect, that is, an optical-system correction coefficient based on the vignetting effect is determined by the optical system and can be examined by calculation or experiment. With the optical-system correction coefficient based on the vignetting effect, the fluorescence intensity at each of the imaging points 22 can be calculated from the fluorescence intensity at each of the light-emission points 20.

System Configuration Example for Data Analysis and Device Control

Figure 3:
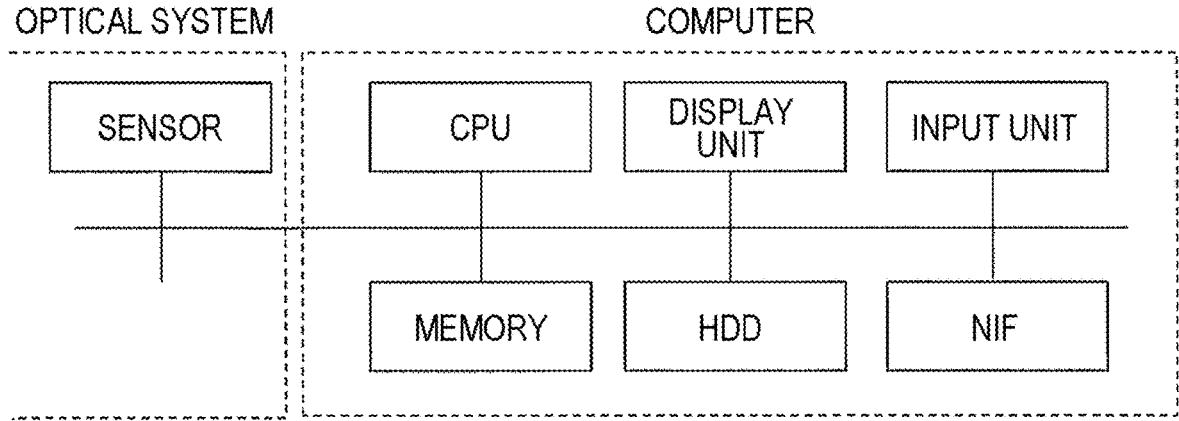
FIG. 3 is a diagram illustrating a configuration example illustrating cooperation between a sensor and a computer.

FIG. 3 shows a configuration example illustrating cooperation between the sensor and a computer. The optical system is a part of the capillary-array-electrophoresis device. The sensor is a part of the optical system. The computer is connected to the capillary-array-electrophoresis device. The computer not only performs data analysis but also controls the capillary-array-electrophoresis device. Conditions for the data analysis and conditions for the control of the capillary-array-electrophoresis device are set through a touch panel, a keyboard, a mouse, or the like which is an input unit. Pieces of time-series raw data of signals output from the sensor are sequentially stored in a memory. Further, analysis parameter information stored in a database in an HDD is stored in the memory. A CPU analyzes the time-series raw data stored in the memory using the analysis parameter information stored in memory to derive pieces of time-series analysis data. The CPU sequentially stores the pieces of time-series analysis data in the memory and simultaneously displays the pieces of time-series analysis data on a monitor which is a display unit. Further, an analysis result can be collated with information on a network through a network interface NIF.

Configuration Example of Capillary Array of Related Art (PTL 1)

Figure 4:
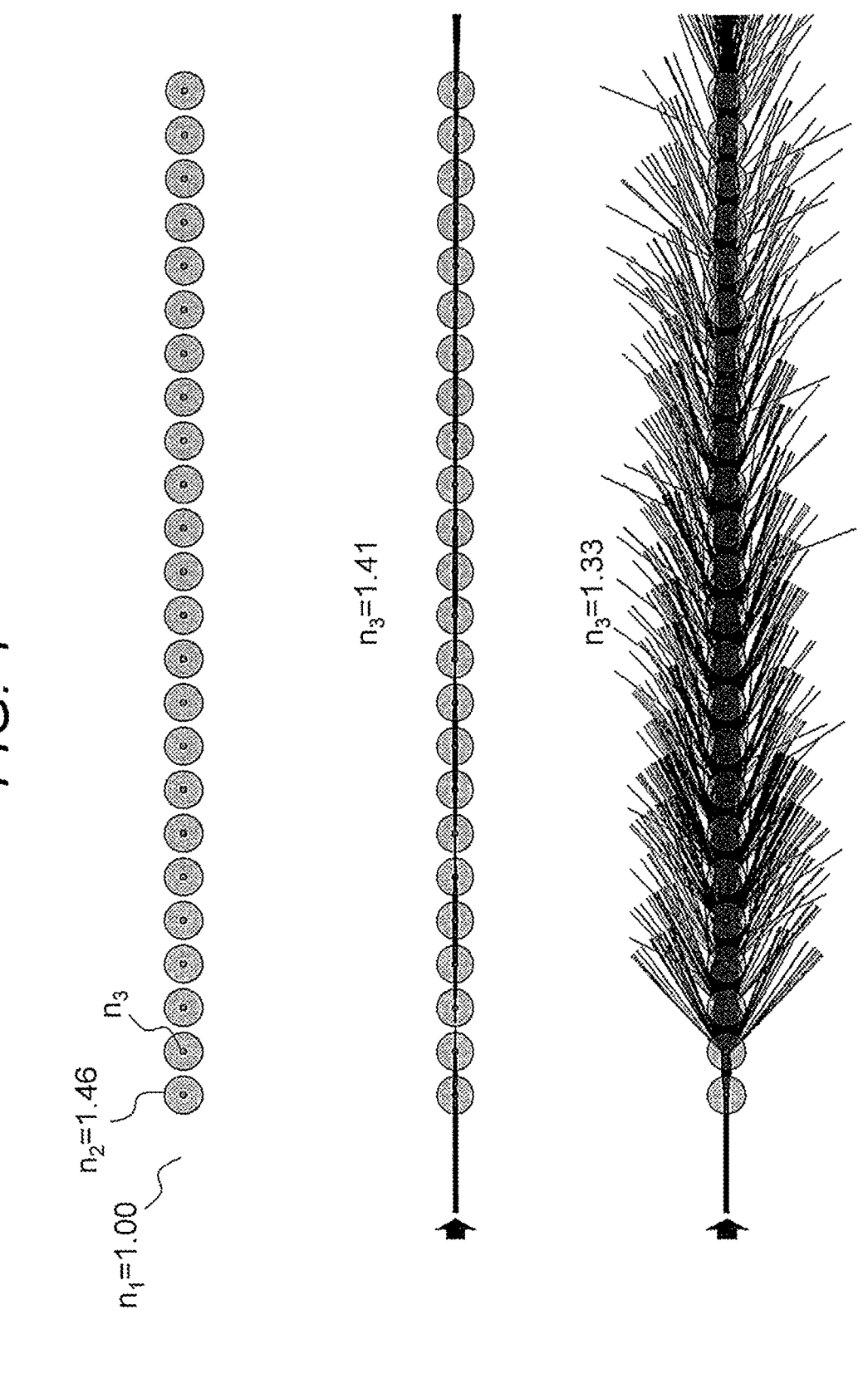
FIG. 4 is a view illustrating a configuration of a capillary array based on PTL 1 and laser-beam ray tracing results.

FIG. 4(*a*) is a cross-sectional view illustrating a configuration of a capillary array of the 3500 Series Genetic Analyzer based on PTL 1. Laser-irradiation portions of 24 capillaries, each having an outer diameter 2R=323 μm and an inner diameter 2r=50 μm, are arrayed on the same plane (array plane) at an interval of 370 μm. An array-plane error is zero (ΔZ=0 μm). The outside of the capillaries is air and has $n_1$=1.00. A material of the capillaries is quartz glass and has $n_2$=1.46.

FIG. 4(*b*) is a view illustrating a laser-beam ray-tracing result when a laser beam having φ50 μm is incident from one side (the left side) of the array plane in a case where the inside of the capillaries is a separation medium having a high refractive index with $n_3$=1.41 under the above-described conditions. Since the multiple laser-beam focusing obviously functions, the insides of all the 24 capillaries have been efficiently irradiated. This corresponds to results that Δθ=−1.3° according to Formula (1) and then each of the capillaries exhibits a convex lens function.

On the other hand, FIG. 4(*c*) is a view illustrating a similar laser-beam ray tracing result in a case where the inside of the capillaries is a separation medium having a low refractive index with $n_3$=1.33 under the above-described conditions. Since the multiple laser-beam focusing obviously does not function, the laser beam is diverged from the capillary array and the entire capillary array has not been efficiently irradiated. This corresponds to results that Δθ=+1.3° according to Formula (1) and each of the capillaries exhibits a concave lens function.

Relative Fluorescence-Intensity Distribution in Capillary-Array Configuration of Related Art (PTL 1)

Figure 5:
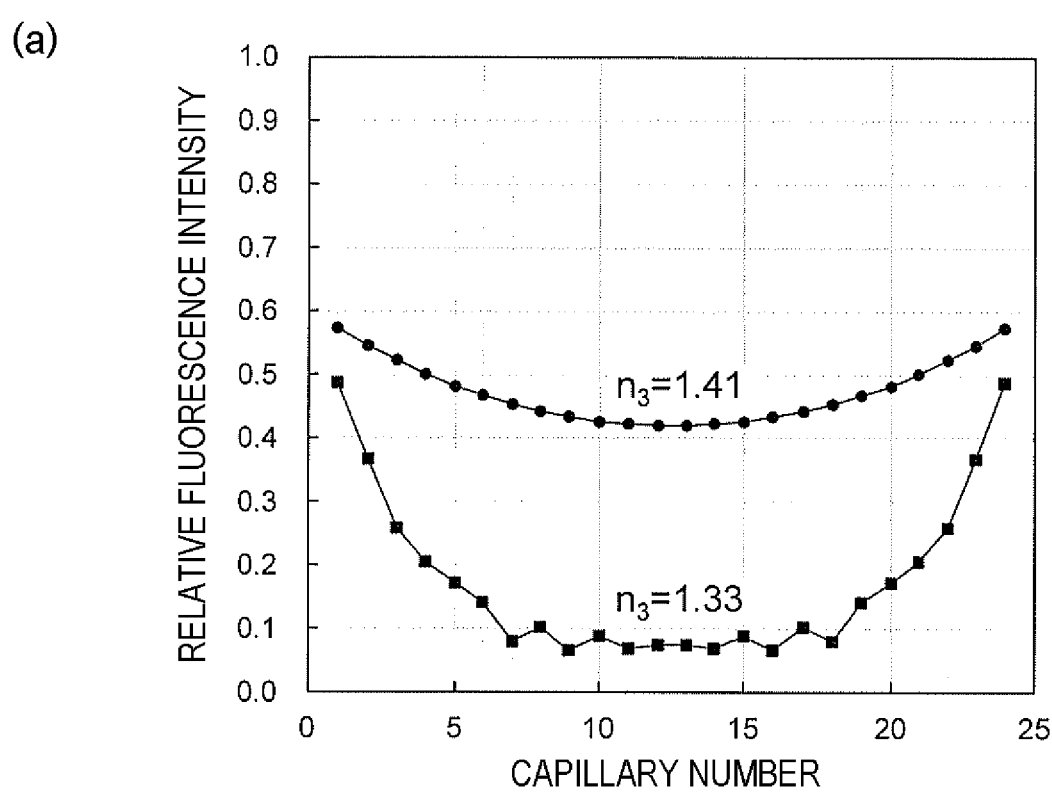
FIG. 5 is a view illustrating relative fluorescence intensity distributions in the capillary array based on PTL 1.
Figure 5:
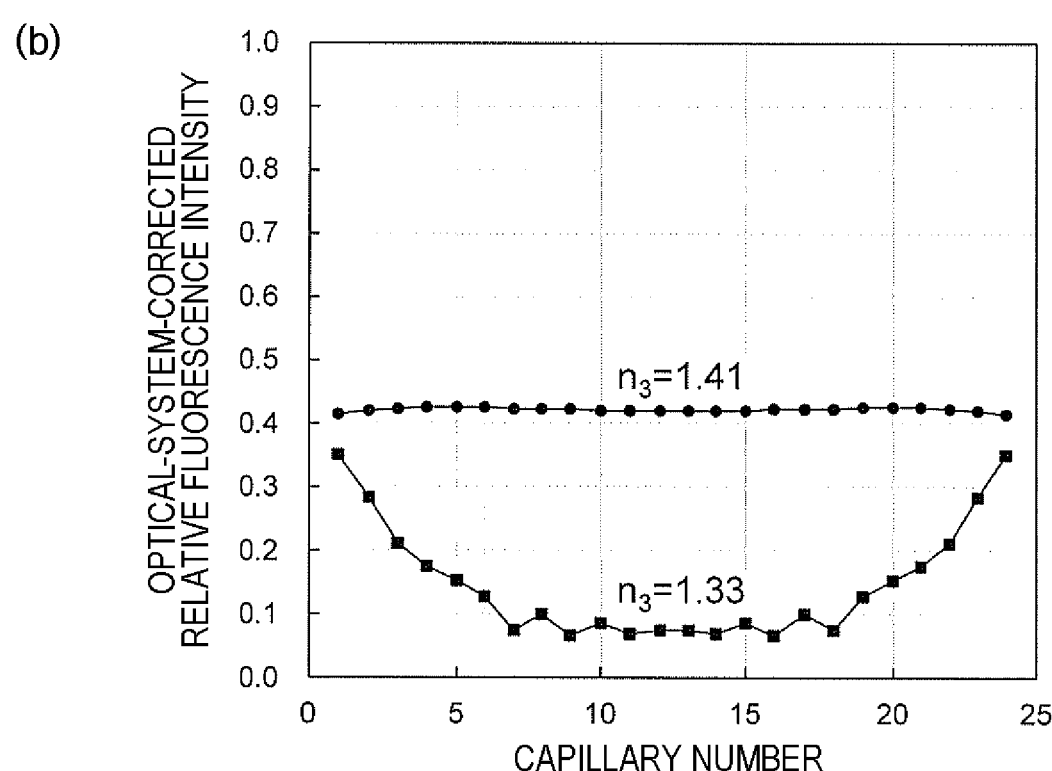

FIG. 5(*a*) is a view illustrating relative fluorescence intensities of the respective capillaries obtained under the one-side irradiation illustrated in FIGS. 4(b) and 4(c) converted to those obtained under the both-side irradiation. Capillary numbers are sequentially assigned in order from left to right, with the leftmost capillary being capillary number 1, in FIGS. 4(a) to 4(c). The relative fluorescence intensity indicates a fluorescence intensity calculated from an irradiation intensity of each of the capillaries in consideration of a laser-beam reflection losses assuming that fluorophores at a constant concentration exist in the laser-irradiation portion of each of the capillaries. The relative fluorescence intensity, expected when a total intensity of the laser beam emitted from a laser-light source irradiates the inside of one capillary, is set to 1. In the calculation of the both-side irradiation, it is assumed that two laser beams with half of the total intensity of the laser beam are irradiated from both sides of the capillary array. When setting to $n_3=1.41$, results that a minimum value of the relative fluorescence intensity is MIN=0.42 and a coefficient of variation (=standard deviation of relative fluorescence intensity/average value of relative fluorescence intensity) is CV=11% are obtained for the 24 capillaries are obtained. It is found from the results that MIN≥0.2 and CV≤20%, which are practical performances, are satisfied. The reason why the relative fluorescence intensity with respect to the capillary number shows downward convex distribution is that the intensity of the laser beam attenuates due to reflection losses as the laser beam travels in the capillary array although the multiple laser-beam focusing is functioning. On the other hand, when setting to $n_3=1.33$, MIN=0.068 and CV=74% are obtained and it is found that the practical performances are not satisfied.

FIG. 5(b) is a view illustrating optical-system-corrected relative fluorescence intensities of the respective capillaries obtained by giving a vignetting effect of the optical system of the 3500 Series Genetic Analyzer on the results of FIG. 5(a), that is, by multiplying the results of FIG. 5(a) by optical-system-correction coefficients based on the vignetting effect. When setting to $n_3=1.41$, since the downward convex distribution of the relative fluorescence intensity and a distribution of optical-system-correction coefficients with respect to the capillary number cancel each other, the optical-system-corrected relative fluorescence intensity has a flat distribution. As a result, the minimum value MIN=0.42 of the fluorescence intensity did not change, but the coefficient of variation significantly decreased to CV=0.76%. Of course, the practical performances are satisfied. On the other hand, when setting to $n_3=1.33$, MIN=0.066 and CV=61% are obtained with little change. The practical performances are still not satisfied.

Configuration Example of Capillary Array of
Related Art (PTL 2)

FIG. 6(a) is a cross-sectional view illustrating a configuration of a capillary array of the 3730 Series Genetic Analyzer based on PTL 2. Laser-irradiation portions of 96 capillaries, each having an outer diameter $2R=126$ μm and an inner diameter $2r=50$ μm, are arrayed on the same plane at an interval of 155 μm. An array-plane error is zero ($\Delta Z=0$ μm). The outside of the capillaries is a fluorine solution and has $n_1=1.29$. A material of the capillaries is quartz glass and has $n_2=1.46$.

FIG. 6(b) is a view illustrating a laser-beam ray tracing result when a laser beam having ϕ50 μm is incident from one side (the left side) of the array plane in a case where the inside of the capillaries is a separation medium having a high refractive index with $n_3=1.41$ under the above-described conditions. Since the multiple laser-beam focusing functions, the insides of all the 96 capillaries have been efficiently irradiated. This corresponds to results that $\Delta\theta=-0.69°$ is obtained according to Formula (1) and that each of the capillaries exhibits the convex lens function.

On the other hand, FIG. 6(c) is a view illustrating a similar laser-beam ray tracing result in a case where the inside of the capillaries is a separation medium having a low refractive index with $n_3=1.33$ under the above-described conditions. Since the multiple laser-beam focusing does not function, the laser beam is diverged from the capillary array and the entire capillary array has not been efficiently irradiated. This corresponds to results that $\Delta\theta=+2.9°$ is obtained according to Formula (1) and each of the capillaries exhibits a concave lens function.

Relative Fluorescence-Intensity Distribution
According to Capillary-Array Configuration of
Related Art (PTL 2)

FIG. 7(a) is a view illustrating relative fluorescence intensities of the respective capillaries obtained under the one-side irradiation illustrated in FIGS. 6(b) and 6(c) converted to those under the both-side irradiation. When setting to $n_3=1.41$, results that a minimum value of the relative fluorescence intensity is MIN=0.63 and a coefficient of variation is CV=3.2% are obtained for the 96 capillaries. It is found from the results that MIN≥0.2 and CV≤20%, which are the practical performances, are satisfied. On the other hand, when setting to $n_3=1.33$, MIN=0.00067 and CV=192% are obtained and it is found that the practical performances are not satisfied.

FIG. 7(b) is a view illustrating optical-system-corrected relative fluorescence intensities of the respective capillaries obtained by giving a vignetting effect of the optical system of the 3730 Series Genetic Analyzer on the results of FIG. 7(a), that is, by multiplying the results of FIG. 7(a) by optical-system-correction coefficients based on the vignetting effect. When setting to $n_3=1.41$, the relative fluorescence intensity shows a slightly downward convex distribution with respect to the capillary number, whereas the optical-system-corrected relative fluorescence intensity shows an upward convex distribution. As a result, the minimum value of the fluorescence intensity slightly decreased to MIN=0.54, and the coefficient of variation slightly increased to CV=4.6%. However, the practical performances are satisfied. On the other hand, when setting to $n_3=1.33$, MIN=0.00066 and CV=183% are obtained with little change. The practical performances are still not satisfied.

Configuration Example of Capillary Array
According to First Embodiment

FIG. 8(a) is a cross-sectional view illustrating a configuration example of a capillary array according to the first embodiment. Laser-irradiation portions of 24 capillaries, each having an outer diameter $2R=126$ μm and an inner diameter $2r=50$ μm, are arrayed on the same plane at an interval of 155 μm. An array-plane error is zero ($\Delta Z=0$ μm). The outside of the capillaries is air and has $n_1=1.00$. A material of the capillaries is quartz glass and has $n_2=1.46$.

FIG. 8(b) is a view illustrating a laser-beam ray tracing result when a laser beam having ϕ50 μm is incident from one side (the left side) of the array plane in a case where the inside of the capillaries is a separation medium having a high refractive index with $n_3=1.41$ under the above-described conditions. Since the multiple laser-beam focusing obviously functions, the insides of all the 24 capillaries have been efficiently irradiated. This corresponds to results that $\Delta\theta=-5.8°$ is obtained according to Formula (1) and each of the capillaries exhibits the convex lens function.

On the other hand, FIG. 8(c) is a view illustrating a similar laser-beam ray tracing result in a case where the inside of the capillary is a separation medium having a low refractive index with $n_3=1.33$ under the above-described conditions. Also in this case, since the multiple laser-beam focusing functions, the insides of all the 24 capillaries have been efficiently irradiated. This corresponds to results that $\Delta\theta=-3.2°$ is obtained according to Formula (1) and each of the capillaries exhibits the convex lens function. In this manner, it is hardly realized by any known technique but realized only by the technique of the present disclosure that each of the capillaries exhibits the convex lens function and the multiple laser-beam focusing functions when both the separation medium having a high refractive index ($n_3 \geq 1.36$) and the separation medium having a low refractive index ($n_3 < 1.36$) are used. That is, in the capillary-array-electrophoresis device of the present embodiment, the multiple laser-beam focusing functions in both the first analysis mode in which $n_3 < 1.36$ is set and the second analysis mode in which $n_3 \geq 1.36$ is set.

Relative Fluorescence-Intensity Distribution According to Capillary-Array Configuration of First Embodiment (FIG. 8)

FIG. 9(a) is a view illustrating relative fluorescence intensities of the respective capillaries obtained under the one-side irradiation illustrated in FIGS. 8(b) and 8(c) converted to those under the both-side irradiation. When setting to $n_3=1.41$, results that a minimum value of the relative fluorescence intensity is MIN=0.42 and a coefficient of variation is CV=11% are obtained for the 24 capillaries. It is found from the results that MIN$\geq$0.2 and CV$\leq$20%, which are the practical performances, are satisfied. On the other hand, since MIN=0.40 and CV=12% are obtained in the case of $n_3=1.33$, it is understood that the practical performances are also satisfied.

FIG. 9(b) is a view illustrating optical-system-corrected relative fluorescence intensities of the respective capillaries obtained by giving the vignetting effect of the optical system of the 3500 Series Genetic Analyzer on the results of FIG. 9(a), that is, by multiplying the results of FIG. 9(a) by the optical-system-correction coefficients based on the vignetting effect. The optical-system correction used here is the same as that used in FIG. 5(b), but the relative fluorescence intensity does not change much depending on the presence or absence of the optical-system correction, unlike the case of FIG. 5(b). When setting to $n_3=1.41$, MIN=0.42 and CV=9.0% are obtained. When setting to $n_3=1.33$, MIN=0.40 and CV=10% are obtained. This is because the vignetting effect of the optical system is small since an overall width of the capillary array in FIG. 8 (the interval of 155 µm×(24-1)=3.6 mm) is narrower than that in FIG. 4 (the interval of 370 µm×(24-1)=8.5 mm). That is, a distance of each of the capillaries from an optical axis in FIG. 8 is shorter than that in FIG. 4.

Summary of First Embodiment

From the above, it has become clear that each of the capillaries exhibits the convex lens function and that the multiple laser-beam focusing functions when a separation medium having an arbitrary refractive index of $n_3 \geq 1.33$ including $n_3=1.41$ is used in the configuration of the first embodiment. Further, as a modification of the present configuration, each of the capillaries exhibits a convex lens function under the condition of $n_3 \geq 1.33$ when using any capillary having R/r$\leq$4.4 is used, for example, any capillary having an outer diameter of 2R$\leq$220 µm in a case where an inner diameter 2r=50 µm is fixed. Thus, it is possible to cause the multiple laser-beam focusing to function.

(C) Second Embodiment

The first embodiment illustrates the results of studies in the case where the capillary array has the array-plane error of zero ($\Delta Z=0$ µm). However, $\Delta Z$ is not 0 µm practically. Therefore, a second embodiment systematically studies a relationship between (i) an array-plane error and (ii) a multiple laser-beam focusing performance and a relative fluorescence intensity of each of capillaries. Furthermore, the second embodiment also studies a relationship between the array-plane error and a production cost of a capillary array. These studies are conducted for the first time by the technique of the present disclosure.

<Definition of Array-Plane Error of Capillary Array>

FIG. 10 is a view for describing a definition of an array-plane error $\Delta Z$. FIG. 10(a) is a cross-sectional view illustrating a 24-capillary array when the array-plane error is 0 ($\Delta Z=0$ µm). This configuration is the same as that of FIG. 8(a). An X axis is set along an array plane. A Z axis is set in a direction perpendicular to the array plane. Further, a Y axis is set in a direction parallel to a central axis of each of the capillaries. The central axis of each of the capillaries is on the X-axis and has a Z-coordinate being zero.

On the other hand, FIG. 10(b) is a cross-sectional view illustrating a 24-capillary array when there is a certain array-plane error ($\Delta Z\neq0$ µm). X-coordinates of central axes of the respective capillaries are the same as those in the case of FIG. 10(a), but Z-coordinates randomly vary up and down around the X axis (Z=0 µm). Here, $\Delta Z$ is a maximum value of absolute values of the respective Z-coordinates. That is, a distance between the X axis and the central axis of the capillary farthest from the X axis is defined as $\Delta Z$. The Z-coordinates of the central axes of the capillaries are randomly dispersed within a range of $\pm\Delta Z$. $\Delta Z$ is an index that quantitatively indicates a magnitude of the array-plane error.

<Relationship Between Array-Plane Error of Capillary Array and Production Cost>

FIG. 11 is a view illustrating results of studying the relationship between the array-plane error $\Delta Z$ of the capillary array and the production cost. A structure of the capillary array is the same as that in FIG. 8(a). Laser-irradiation portions of the 24 capillaries, each having an outer diameter 2R=126 µm and an inner diameter 2r=50 µm, are arrayed on the same plane at an interval of 155 µm. The outside of the capillaries is air and has $n_1=1.00$. A material of the capillaries is quartz glass and has $n_2=1.46$. Under the above conditions, a large number of the capillary arrays were produced such that the array-plane error approaches zero as much as possible. The array-plane error $\Delta Z$ of each of the produced capillary arrays was measured using a laser microscope.

FIG. 11(a) is a view illustrating a result of fitting a relationship between the array-plane error $\Delta Z$ and its production frequency with a Gaussian distribution with a mode value being 1. The mode value was obtained when $\Delta Z=6.1$ µm. A standard deviation was 1.6 µm. The number of the capillary arrays with $\Delta Z=0$ µm was substantially zero.

FIG. 11($b$) is a view illustrating a result of deriving a relationship between an acceptable array-plane error $\Delta Z$ and its production yield of the capillary arrays from the result of FIG. 11($a$). The production yield was 0% when $\Delta Z \leq 1.9$ μm, 10% when $\Delta Z = 4.1$ μm, 50% when $\Delta Z = 6.1$ μm, 90% when $\Delta Z = 8.1$ μm, and 100% when $\Delta Z \geq 10.3$ μm. The production yield increased as $\Delta Z$ increased.

FIG. 11($c$) is a view illustrating a result of deriving a relationship between an acceptable array-plane error $\Delta Z$ and its reference-production-cost ratio of the capillary arrays from the result of FIG. 11($b$). A reference-production cost with a yield of 100% is defined as 1. The reference-production-cost ratio indicates how many times the reference-production cost is required. The reference-production-cost ratio was 1.0 when $\Delta Z \geq 11.4$ μm, 2.0 when $\Delta Z = 6.1$ μm, 4.1 when $\Delta Z = 5.0$ μm, and 10.5 when $\Delta Z = 4.0$ μm. The reference-production-cost ratio increased as $\Delta Z$ decreased.

<Relationship Between Array-Plane Error of Capillary Array and Relative Fluorescence Intensity>

FIGS. 12 and 13 are views illustrating relative fluorescence intensities of the respective capillaries obtained by both-side irradiation with $\Delta Z$ as a parameter, with referenced to when $n_3 = 1.41$ in the 24-capillary array illustrated in FIG. 8($a$). FIG. 12($a$) illustrates a case where $\Delta Z = 0$ μm, FIG. 12($b$) illustrates a case where $\Delta Z = 3$ μm, FIG. 12($c$) illustrates a case where $\Delta Z = 6$ μm, FIG. 13($a$) illustrates a case where $\Delta Z = 9$ μm, and FIG. 13($b$) illustrates a case where $\Delta Z = 12$ μm. The relative fluorescence intensities of the 24 capillaries in one set of capillary array are shown when $\Delta Z = 0$ μm and the relative fluorescence intensities of the 24 capillaries in ten sets of randomly-arrayed capillary arrays are overlaid when $\Delta Z \neq 0$ μm. FIG. 12($a$) ($\Delta Z = 0$ μm) illustrates the same results as the case of $n_3 = 1.41$ in FIG. 9($a$). FIG. 13($c$) overlays the relative fluorescence intensities of the respective capillaries in the one set of the 24-capillary array when $\Delta Z = 0$ μm, and the averaged relative fluorescence intensities of the respective capillaries in the ten sets of the 24-capillary arrays when $\Delta Z \neq$μm. It is found that, as $\Delta Z$ increases, an average value and a minimum value of the relative fluorescence intensities decrease and that the relative fluorescence intensity greatly varies between the capillaries in the 24-capillary array. The minimum values of the relative fluorescence intensities were MIN=0.42 when $\Delta Z = 0$ μm, MIN=0.40 when $\Delta Z = 3$ μm, MIN=0.33 when $\Delta Z = 6$ μm, MIN=0.22 when $\Delta Z = 9$ μm, and MIN=0.066 when $\Delta Z = 12$ μm. Further, coefficients of variation of the relative fluorescence intensities were CV=11% when $\Delta Z = 0$ μm, CV=11% when $\Delta Z = 3$ μm, CV=12% when $\Delta Z = 6$ μm, CV=17% when $\Delta Z = 9$ μm, and CV=28% when $\Delta Z = 12$ μm. Here, the minimum values and the coefficients of variation are obtained for the 24 capillaries in the one set of the 24-capillary array when $\Delta Z = 0$ μm, and for the 240 capillaries in the ten sets of the 24-capillary arrays when $\Delta Z \neq 0$ μm.

From the above, it has been found that $\Delta Z \leq 9$ μm is preferable to satisfy MIN≥0.2, which is the practical performance. Further, it has been found that $\Delta Z \leq 9$ μm or $\Delta Z \leq 6$ μm is preferable to satisfy CV≤20% or CV≤15% which is the practical performance.

FIGS. 14 and 15 are views illustrating relative fluorescence intensities of the respective capillaries obtained by both-side irradiation with $\Delta Z$ as a parameter, with reference to when $n_3 = 1.33$ in the 24-capillary array illustrated in FIG. 8($a$). FIG. 14($a$) illustrates a case where $\Delta Z = 0$ μm, FIG. 14($b$) illustrates a case where $\Delta Z = 3$ μm, FIG. 14($c$) illustrates a case where $\Delta Z = 6$ μm, FIG. 15($a$) illustrates a case where $\Delta Z = 9$ μm, and FIG. 15($b$) illustrates a case where $\Delta Z = 12$ μm. The relative fluorescence intensities of the 24 capillaries in one set of capillary array are shown when $\Delta Z = 0$ μm and the relative fluorescence intensities of the 24 capillaries in ten sets of randomly-arrayed capillary arrays are overlaid when $\Delta Z \neq 0$ μm. FIG. 14($a$) ($\Delta Z = 0$ μm) illustrates the same results as the case of $n_3 = 1.33$ in FIG. 9($a$). FIG. 15($c$) overlays the relative fluorescence intensities of the respective capillaries in the one set of the 24-capillary array when $\Delta Z = 0$ μm, and averaged relative fluorescence intensities of the respective capillaries in the ten sets of the 24-capillary arrays when $\Delta Z \neq 0$ μm. It is found that, as $\Delta Z$ increases, an average value and a minimum value of the relative fluorescence intensities decrease and that the relative fluorescence intensity greatly varies between the capillaries in the 24-capillary array. The minimum values of the relative fluorescence intensities were MIN=0.40 when $\Delta Z = 0$ μm, MIN=0.39 when $\Delta Z = 3$ μm, MIN=0.30 when $\Delta Z = 6$ μm, MIN=0.25 when $\Delta Z = 9$ μm, and MIN=0.058 when $\Delta Z = 12$ μm. Further, coefficients of variation of the relative fluorescence intensities were CV=12% when $\Delta Z = 0$ μm, CV=12% when $\Delta Z = 3$ μm, CV=14% when $\Delta Z = 6$ μm, CV=16% when $\Delta Z = 9$ μm, and CV=28% when $\Delta Z = 12$ μm. Here, the minimum values and the coefficients of variation are obtained for the 24 capillaries in the one set of the 24-capillary array when $\Delta Z = 0$ μm, and for the 240 capillaries in the ten sets of the 24-capillary arrays when $\Delta Z \neq 0$ μm.

Summary of Second Embodiment

From the above, it has been found that $\Delta Z \leq 9$ μm is preferable to satisfy MIN≥0.2, which is the practical performance. Further, it has been found that $\Delta Z \leq 9$ μm or $\Delta Z \leq 6$ μm is preferable to satisfy CV≤20% or CV≤15% which is the practical performance. These results are the same as the results in the case of $n_3 = 1.41$ illustrated in FIGS. 12 and 13.

According to the result of FIG. 11($c$), a reference-production-cost ratio when $\Delta Z = 9$ μm is only 1.04, that is, an increase of 4% from the reference. Further, a reference-production-cost ratio when $\Delta Z = 6$ μm is 2.10, that is, about twice the reference. Therefore, it is found that these production costs are within the acceptable range and therefore the above-described conditions can be realized.

In general, convex lens function of a capillary filled with a separation medium having a refractive index of $n_3 = 1.33$ is the weakest among convex lens functions of capillaries filled with separation media having any refractive index of $n_3 \geq 1.33$, as can be seen from Formula (1). Therefore, the practical performances are satisfied under any conditions using separation media with $n_3 \geq 1.33$ as long as the practical performances are satisfied under the condition using a separation medium with $n_3 = 1.33$. That is, the above study results are also established when using the separation media having any refractive index of $n_3 \geq 1.33$. Further, as a modification of the present configuration, each of the capillaries exhibits a convex lens function under the condition of $n_3 \geq 1.33$ when using any capillary having R/r≤4.4, for example, using any capillary having an outer diameter of 2R≤220 μm in a case where an inner diameter 2r=50 μm is fixed. Thus, it is possible to cause the multiple laser-beam focusing to function, and the practical performances are satisfied.

(D) Third Embodiment

A third embodiment studies in more detail the relationship between (i) the array-plane error and (ii) the multiple laser-beam focusing performance, and the relative fluorescence intensity of each of the capillaries, studied in the second embodiment.

<Relationship Between Array-Plane Error of Capillary Array and Relative Fluorescence Intensity>

FIG. 16(a) is a view illustrating a relationship between array-plane error $\Delta Z$ ($\Delta Z$ is changed to 0.0, 1.5, 3.0, 4.5, 6.0, 7.5, 9.0, 10.5, 12.0, 13.5, and 15.0 μm) and relative fluorescence intensity when both-side irradiation is used and $n_3$=1.41 in the 24-capillary array illustrated in FIG. 8(a). FIG. 16(c) is a view illustrating a relationship between array-plane error $\Delta Z$ and coefficient of variation of the relative fluorescence intensity under the same conditions. FIGS. 16(b) and 16(d) are enlarged views of FIGS. 16(a) and 16(c), respectively. One set of capillary array is used for $\Delta Z$=0.0 μm, and 100 sets of randomly-arrayed capillary arrays are used for $\Delta Z$≠0.0 μm. In FIGS. 16(a) and 16(b), relative fluorescence intensity data from the 24 capillaries were used for $\Delta Z$=0.0 μm, and relative fluorescence intensity data from the 2400 capillaries were used for $\Delta Z$≠0.0 μm. Black circle plots indicate average values. Error bars indicate ±standard deviations. Black triangle plots indicate maximum values. Black square plots indicate minimum values. As $\Delta Z$ increases, all of the average value, the maximum value, and the minimum value of the relative fluorescence intensity decrease, but the standard deviation of the relative fluorescence intensity increases. In FIGS. 16(c) and 16(d), the one set of coefficients of variation of relative fluorescence intensities was used for $\Delta Z$=0.0 μm, and the 100 sets of coefficients of variation of relative fluorescence intensities were used for $\Delta Z$≠0.0 μm. black circle plots indicate average values. Error bars indicate ±standard deviations. Black triangle plots indicate maximum values. Black square plots indicate minimum values. As $\Delta Z$ increases, all of the average value, the maximum value and the minimum value increase, and the standard deviation of the coefficient of variation of the relative fluorescence intensity increases.

When defining a minimum value of the relative fluorescence intensities as MIN in FIGS. 16(a) and 16(b), it is understood that $\Delta Z$≤7.2 μm is preferable to satisfy MIN≥0.2 which is the practical performance. Alternatively, when defining "average value–standard deviation" of the relative fluorescence intensities as MIN in FIGS. 16(a) and 16(b), it is understood that $\Delta Z$≤14.2 μm is preferable to satisfy MIN≥0.2 which is the practical performance. On the other hand, when defining as CV "standard deviation/average value" of the relative fluorescence intensities in FIGS. 16(c) and 16(d), it is understood that $\Delta Z$≤8.2 μm or $\Delta Z$≤6.4 μm is preferable to respectively satisfy CV≤20% or CV≤15% which is the practical performance.

FIG. 17 is a view illustrating relationships between array-plane error $\Delta Z$ and relative fluorescence intensity and its coefficient of variation when $n_3$=1.33 (results when $n_3$=1.41 is changed to $n_3$=1.33 in FIG. 16). In FIGS. 17(a) and 17(b), as $\Delta Z$ increases, all of average value, maximum value, and minimum value decrease, but standard deviation increases as in FIGS. 16(a) and 16(b). In FIGS. 17(c) and 17(d), as $\Delta Z$ increases, all of average value, maximum value, and minimum value increase and a standard deviation increases, as in FIGS. 16(c) and 16(d). When defining a minimum value of relative fluorescence intensities as MIN in FIGS. 17(a) and 17(b), it is understood that $\Delta Z$≤7.8 μm is preferable to satisfy MIN≥0.2 which is the practical performance. Alternatively, when defining "average value standard deviation" of the relative fluorescence intensities as MIN in FIGS. 17(a) and 17(b), it is understood that $\Delta Z$≤14.8 μm is preferable to satisfy MIN≥0.2 which is the practical performance. On the other hand, when defining as CV "standard deviation/average value" of the relative fluorescence intensities in FIGS. 17(c) and 17(d), it is understood that $\Delta Z$≤8.3 μm or $\Delta Z$≤5.7 μm is preferable to respectively satisfy CV≤20% or CV≤15% which is the practical performance.

As described above, $\Delta Z$≤7.2 μm is preferable to satisfy MIN≥0.2, which is the practical performance, when defining the minimum value of the relative fluorescence intensities as MIN, in the case of using the separation media having any refractive index of $n_3$≥1.33. A reference-production-cost ratio for $\Delta Z$=7.2 μm is only 1.32, that is, an increase of 32% from the reference. When defining "standard deviation/average value" of the relative fluorescence intensities as CV, $\Delta Z$≤8.2 μm or $\Delta Z$≤5.7 μm is preferable to respectively satisfy CV≤20% or CV≤15% which is the practical performance. A reference-production-cost ratio is 1.10 for $\Delta Z$=8.2 μm and is 2.48 for $\Delta Z$=5.7 μm. These production costs are within the acceptable range, and therefore the above conditions can be implemented.

<Relationship Between Capillary-Outer Diameter and Array-Plane Error>

FIG. 18 is a view illustrating a relationship between capillary-outer diameter 2R and array-plane error $\Delta Z$ satisfying CV≤20% or CV≤15%, which is the practical performance as in FIG. 17. The capillary-outer diameter 2R is changed within a range of 75 μm≤2R≤250 μm under the conditions of FIG. 17. Array interval in the capillary arrays is 2R+29 μm for each 2R. As described above, since each of the capillaries exhibits a concave lens function when 2R>220 μm is obtained according to Formula (1), the multiple laser-beam focusing does not function and thus CV≤20% or CV≤15% is not satisfied. For these conditions, the array-plane error $\Delta Z$ on the vertical axis in FIG. 18 is indicated by zero. From the results of FIG. 18, $\Delta Z$≤9 μm is preferable to satisfy CV≤20%, which is the practical performance, when the capillary-outer diameter 2R is appropriately selected within a range of 100 μm≤2R≤200 μm or a ratio R/r of the outer diameter to an inner diameter of the capillary is appropriately selected within a range of 2≤R/r≤4. Further, $\Delta Z$≤6 μm is preferable to satisfy CV≤15%, which is practical performance, when the capillary-outer diameter 2R is appropriately selected within a range of 100 μm≤2R≤175 μm, or the ratio R/r of the outer diameter to the inner diameter of the capillary is appropriately selected within a range of 2≤R/r≤3.5. A reference-production-cost ratio is 1.04 when $\Delta Z$=9 μm and is 2.10 when $\Delta Z$=6 μm. These production costs are within the acceptable range, and therefore the above conditions can be implemented.

As described above, the present disclosure is based on the fact that the insides of all the capillaries constituting the capillary array are filled with the same separation medium having the same refractive index $n_3$ in a single analysis mode. However, this is not always required. That is, the inside of each of the capillaries constituting the capillary array may be filled with different separation media having different refractive indexes $n_3$ in a single analysis mode or in single capillary-array-electrophoresis analysis. This is because each of the capillaries exhibits the convex lens function and the multiple laser-beam focusing functions at least when the refractive indices of the separation media filling the respective capillaries fall within a range of 1.33≤$n_3$≤1.41. For example, even if using a capillary array, in a single analysis mode, in which capillaries filled with a separation medium having a low refractive index of $n_3$=1.33 and capillaries filled with a separation medium having a high refractive index of $n_3$=1.41 are alternately arrayed, it is possible to efficiently and simultaneously irradiate all the capillaries constituting the capillary array with a laser beam since each of the capillaries exhibits the convex lens function and the multiple laser-beam focusing functions. A plurality of the polymer blocks 9 illustrated in FIG. 1 may be used to fill capillaries with different separation media having different refractive indexes $n_3$. If the sample-elution end 3 of each of the capillaries is connected to any one of the plurality of polymer blocks 9, each of the capillaries can be filled with a separation medium having a desired refractive index $n_3$.

REFERENCE SIGNS LIST

1 capillary
2 sample-injection end
3 sample-elution end
4 cathode
5 anode
6 cathode-side-buffer solution
7 anode-side-buffer solution
8 power supply
9 polymer block
10 valve
11 syringe
12 laser-light source
13 laser beam
14 laser-irradiation portion
15 condenser lens
16 laser-cut filter
17 transmissive-diffraction grating
18 imaging lens
19 sensor
20 light-emission point
21 fluorescence
22 imaging point
23 optical axis

The invention claimed is:

1. A capillary-array-electrophoresis device comprising:
a laser-light source configured to emit a laser beam;
a capillary array configured as laser-irradiation portions of a plurality of capillaries collectively irradiated with the laser beam are substantially arrayed on a same array plane; and
an optical system configured to collectively measure light emission from the plurality of capillaries,
wherein $n_1=1.00$, $n_2=1.46\pm0.01$, $n_3<1.36$, and $R/r<5.9$ are satisfied,
wherein R, r, $n_1$, and $n_2$ denote an outer radius, an inner radius, a refractive index of an external medium, and a refractive index of a material, of the plurality of capillaries, respectively and,
wherein $n_3$ denotes a refractive index of an internal medium in each of the plurality of capillaries in the laser irradiation portions,
wherein $\Delta Z \leq 9$ μm is satisfied, and
when defining a distance in a direction perpendicular to the array plane between two capillaries, which are farthest from each other in the perpendicular direction among the plurality of capillaries in the laser-irradiation portions as $2 \times \Delta Z$.

2. The capillary-array-electrophoresis device according to claim 1, wherein $2 \leq R/r \leq 4$ is satisfied.

3. The capillary-array-electrophoresis device according to claim 1, wherein $\Delta Z \leq 6$ μm is satisfied.

4. The capillary-array-electrophoresis device according to claim 1, wherein a condition $2 \leq R/r \leq 3.5$ is satisfied.

22

5. A capillary-array-electrophoresis device comprising:
a laser-light source configured to emit a laser beam;
a capillary array configured as laser irradiation portions of a plurality of capillaries collectively irradiated with the laser beam are substantially arrayed on a same array plane; and
an optical system configured to collectively measure light emission from the plurality of capillaries,
wherein $n_1=1.00$, $n_2=1.46\pm0.01$, and $R/r<5.9$ are satisfied,
wherein an outer radius, an inner radius, a refractive index of an external medium, a refractive index of a material, and a refractive index of an internal medium of each of the plurality of capillaries in the laser-irradiation portions are denoted by R, r, $n_1$, $n_2$, and $n_3$, respectively, and
wherein the capillary-array-electrophoresis device has a plurality of analysis modes including a first analysis mode in which $n_3<1.36$ and a second analysis mode in which $n_3 \geq 1.36$.

6. The capillary-array-electrophoresis device according to claim 5, wherein $R/r \leq 5.3$ and $n_3 \leq 1.35$ are satisfied in the first analysis mode.

7. The capillary-array-electrophoresis device according to claim 5, wherein $R/r \leq 4.8$ and $n_3 \leq 1.34$ are satisfied in the first analysis mode.

8. The capillary-array-electrophoresis device according to claim 7, wherein $R/r \leq 4.4$ and $n_3=1.33\pm0.01$ are satisfied in the first analysis mode.

9. The capillary-array-electrophoresis device according to claim 5, wherein $\Delta Z \leq 9$ μm is satisfied,
when defining a distance in a direction perpendicular to the array plane between two capillaries, which are farthest from each other in the perpendicular direction among the plurality of capillaries in the laser-irradiation portions as $2 \times \Delta Z$.

10. The capillary-array-electrophoresis device according to claim 9, wherein $2 \leq R/r \leq 4$ is satisfied.

11. The capillary-array-electrophoresis device according to claim 9, wherein $\Delta Z \leq 6$ μm is satisfied.

12. The capillary-array-electrophoresis device according to claim 11, wherein $2 \leq R/r \leq 3.5$ is satisfied.

13. A capillary-array-electrophoresis device comprising:
a laser-light source configured to emit a laser beam;
a capillary array configured as laser-irradiation portions of a plurality of capillaries collectively irradiated with the laser beam are substantially arrayed on a same array plane; and
an optical system configured to collectively measure light emission from the plurality of capillaries,
wherein following (i) and (ii) are satisfied:

$$n_3 < 1.36 \text{ and} \tag{i}$$

[Math. 1]

$$\left| -\sin^{-1}\left(\frac{r}{2 \cdot R}\right) + \sin^{-1}\left(\frac{r \cdot n_1}{2 \cdot R \cdot n_2}\right) - \sin^{-1}\left(\frac{n_1}{2 \cdot n_2}\right) + \sin^{-1}\left(\frac{n_1}{2 \cdot n_3}\right) \right| < 0 \tag{ii}$$

wherein an outer radius, an inner radius, a refractive index of an external medium, a refractive index of a material, and a refractive index of an internal medium of each of the plurality of capillaries in the laser-irradiation portions are denoted by R, r, $n_1$, $n_2$, and $n_3$, respectively, and, wherein $\Delta Z \leq 9$ µm is satisfied when defining as a distance in a direction perpendicular to the array plane between two capillaries, which are farthest from each other in the perpendicular direction among the plurality of capillaries in the laser-irradiation portions $2 \times \Delta Z$.

14. The capillary-array-electrophoresis device according to claim 13, wherein $\Delta Z \leq 6$ µm is satisfied.

\* \* \* \* \*